(12) United States Patent
Gourisetti et al.

(10) Patent No.: US 12,124,582 B2
(45) Date of Patent: Oct. 22, 2024

(54) MITIGATION OF EXTERNAL EXPOSURE OF ENERGY DELIVERY SYSTEMS

(71) Applicant: Battelle Memorial Institute, Richland, WA (US)

(72) Inventors: Sri Nikhil Gupta Gourisetti, Richland, WA (US); Michael E. Mylrea, Alexandria, VA (US); Md. Touhiduzzaman, Richland, WA (US); Travis Ashley, Richland, WA (US); Beverly E. Johnson, Richland, WA (US); Newton B. Brown, Richland, WA (US); Penny L. McKenzie, Richland, WA (US); Seemita Pal, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 663 days.

(21) Appl. No.: 17/117,752

(22) Filed: Dec. 10, 2020

(65) Prior Publication Data

US 2021/0173940 A1 Jun. 10, 2021

Related U.S. Application Data

(60) Provisional application No. 62/946,269, filed on Dec. 10, 2019.

(51) Int. Cl.
*G06F 21/57* (2013.01)
*G06F 16/28* (2019.01)
(Continued)

(52) U.S. Cl.
CPC .......... *G06F 21/577* (2013.01); *G06F 16/285* (2019.01); *G06F 16/953* (2019.01);
(Continued)

(58) Field of Classification Search
CPC .... G06F 21/577; G06F 16/285; G06F 16/953; G06F 2221/034; G05B 19/058; G05B 2219/14006; G05B 2219/15012
See application file for complete search history.

(56) References Cited

U.S. PATENT DOCUMENTS

| 2012/0304300 A1* | 11/2012 | LaBumbard | .......... G06F 21/577 726/25 |
| 2018/0129810 A1* | 5/2018 | Kim | .................. G06F 16/90344 |
| 2021/0037038 A1* | 2/2021 | Alsharif | ................ G06F 21/577 |

OTHER PUBLICATIONS

Al-Alami et al., "Vulnerability Scanning of IoT Devices in Jordan Using Shodan," IEEE International Conference on the Applications of Information Technology in Developing Renewable Energy Processes Systems (IT-DREPS), 6 pages (Dec. 6-8, 2017).
(Continued)

*Primary Examiner* — Matthew T Henning
(74) *Attorney, Agent, or Firm* — Klarquist Sparkman, LLP

(57) ABSTRACT

Method include receiving banner information from one or more queries of a network connecting a set of devices, wherein the banner information of one or more of the devices includes common vulnerability and exposure identifiers (CVEs) and the banner information of one or more of the devices does not include a CVE, identifying the devices based on the banner information including classifying devices without known CVEs by a device type, determining vulnerability scores for the devices with known CVEs based on retrieved CVE information, and determining vulnerability scores for the devices without CVEs based on a series of exploitability and impact parameter estimates associated with the device type classifications. Some methods include estimating a cyberattack vulnerability risk for the devices using the determined vulnerability scores.

20 Claims, 12 Drawing Sheets

(51) Int. Cl.
    *G06F 16/953* (2019.01)
    *G05B 19/05* (2006.01)
(52) U.S. Cl.
    CPC .. *G05B 19/058* (2013.01); *G05B 2219/14006* (2013.01); *G05B 2219/15012* (2013.01); *G06F 2221/034* (2013.01)

(56) References Cited

OTHER PUBLICATIONS

American National Standards Institute/International Society of Automation, ANSI/ISA-99.02.01-2009, Security for Industrial Automation and Control Systems: Establishing an Industrial Automation and Control Systems Security Program, 34 pages, https://www.isa.org/templates/one-column.aspx?pageid=111294&productId=116731 (Jan. 13, 2009).
"Assessments." Cybersecurity & Infrastructure Security Agency, https://us-cert.cisa.gov/ics/Assessments, 3 pages, downloaded Feb. 28, 2021.
Biswas et al., "G-RAM framework for software risk assessment and mitigation strategies in organisations," *Journal of Enterprise Information Management*, 31(2):276-299 (Nov. 3, 2017).
Bodenheim et al., "Evaluation of the ability of the Shodan search engine to identify Internet-facing industrial control devices." *International Journal of Critical Infrastructure Protection*, 7(2):114-123 (Apr. 2, 2014).
Bodenheim, "Impact of the Shodan Computer Search Engine on Internet-facing Industrial Control System Devices," Air Force Institute of Technology Theses and Dissertations, 122 pages (Mar. 14, 2014).
Cherdantseva et al., "A review of cyber security risk assessment methods for SCADA systems," *Computers & Security*, 55:1-27 (Oct. 13, 2015).
Ciapessoni et al., "Probabilistic Risk-Based Security Assessment of Power Systems Considering Incumbent Threats and Uncertainties," *IEEE Transactions on Smart Grid*, 7(6):2890-2903 (Nov. 2016).
"CIS Controls™," V7.1, https://www.cisecurity.org, 76 pages (Apr. 4, 2019).
"Control Objectives for Information Technologies (COBIT)," *ISACA*, https://www.isa.org/resources/cobit, 8 pages, downloaded Mar. 1, 2021.
"Crashoverride Analyzing the Threat to Electric Grid Operations," version 2.20170613, w w w .Dragos.com, 35 pages (2017).
"Cybersecurity Capability Maturity Model (C2M2) Program," Department of Energy, https://www.energy.gov/ceser/energy-security-capability-maturity-model-c2m2-program, 6 pages, downloaded Feb. 28, 2021.
"Cybersecurity Framework," *National Institute of Standards and Technology (NIST)*, https://www.nist.gov/cyberframework, 4 pages, downloaded Feb. 28, 2021.
Durumeric et al., "A Search Engine Backed by Internet-Wide Scanning," CCS ' 15 Proceedings of the 22nd ACM SIGSAC Conference on Computer and Communications Security, pp. 542-553 (Oct. 2015).
Durumeric et al., "Zmap: Fast Internet-wide Scanning and Its Security Applications," Proceedings of the $22^{nd}$ USENIX Security Symposium, Washington, D.C., pp. 605-619 (Aug. 14-16, 2013).
"Electricity Subsector Cybersecurity Capability Maturity Model (ES-C2M2)," Pacific Northwest National Laboratory, https://esc2m2.pool.gov/, 1 page, downloaded Mar. 1, 2021.
"Expander," *Expanse*, https://expanse.co, 10 pages, downloaded Mar. 1, 2021.
"External Surface Management," *Reposify*, http://www.reposify.com, 1 page, downloaded Mar. 1, 2021.
Fairley, "Internet-Exposed Energy Control Systems Abound." *IEEE Spectrum* https://spectrum.ieee.org/energywise/energy/the-smarter-grid/thousands-of-control-systems-connected-to-the-internet, 3 pages (Oct. 21, 2014).
Francia III et al., "Security Best Practices and Risk Assessment of SCADA and Industrial Control Systems," Conference: Security and Management 2012, 7 pages (Jun. 2012).
Gartner Glossary: Operational Technology, https://www.gartner.com/it-glossary/operational-technology-ot/, 4 pages. downloaded Mar. 1, 2021.
Genge et al., "ShoVAT: Shodan-based vulnerability assessment tool for Internet-facing services," *Security and Communication Networks*, 9(15):2696-2714 (May 11, 2015).
Haegley, "DoD: GSA/DoD Control Systems Cyber Policy and Strategy," *OSIsoft*, https://www.energy.gov/ sites/prod/files/2017/04/f34/fupwg spring17 haegley.pdf., 32 pages (2017).
ISO/IEC 27001, "Information technology—Security techniques—Information security management systems—Requirements," https://www.iso.org/54534.html, 35 pages (Oct. 1, 2013).
Lee et al., "Abnormal Behavior-Based Detectionof Shodan and Censys-Like Scanning," Ninth International Conference on Ubiquitous and Future Networks (ICUFN), Milan, pp. 1048-1052 (Jul. 7, 2017).
"Nmap: The Network Mapper—Free Security Scanner," https://nmap.org, 2 pages, downloaded Feb. 28, 2021.
"NVD Data Feeds," https://nvd.nist.gov/vuln/data-feeds, 10 pages, downloaded Feb. 28, 2021.
O'Sullivan et al., "Defending IoT Devices from Malware," *Cyber and Digital Forensic Investigations*, 74:5-29 (Jul. 26, 2020).
"Project SHINE (SHodan INtelligence Extraction) Findings Report," *Infracritical*, 42 pages (Oct. 1, 2014).
Pour, et al., "Comprehending the IoT cyber threat landscape: A data dimensionality reduction technique to infer and characterize Internet-scale IoT probing campaigns," *Digital Investigation*, 28:S40-S49 (Jan. 2019).
"Prads". www.gamelinux.github.io/prads/, 2 page, downloaded Feb. 28, 2021.
"Qadium Announces $40 million in Series B Funding, Led by IVP," *Business Wire*, 2 pages (Aug. 31, 2017).
"Read about our real-world cases," *Thingful*, www.thingful.net, 1 page, downloaded Mar. 1, 2021.
"Roadmap to Achieve Energy Delivery Systems Cybersecurity," U.S. Department of Energy, 80 pages (Sep. 2011).
Rogers et al., "Nessus Network Auditing Second Edition," Syngress Publishing, 448 pages (2008).
Rossebø et al., "An Enhanced Risk-Assessment Methodology for Smart Grids," *Computer*, 50(4):62-71 (Apr. 2017).
Ruan, "Introducing cybernomics: A unifying economic framework for measuring cyber risk," *Computers & Security*, 65:77-89 (Nov. 11, 2015).
"Securing Cyber Assets: Addressing Urgent Cyber Threats to Critical Infrastructure," *NIAC (National Infrastructure Advisory Council)*, 45 pages (Aug. 2017).
"Security and Privacy Controls for Information Systems and Organizations," *NIST Special Publication*, 800-53 Revision 5, https://doi.org/10.6028/NIST.SP.800-53r5, 463 pages (Sep. 2020).
"Self-assessment tools for hardening your facilities against cyber attacks," Pacific Northwest National Laboratory, Facility Cybersecurity web tools, https://facilitycyber.labworks.org/, 3 pages, downloaded Mar. 1, 2021.
"The search engine for the Internet of Things," *Shodan*, https://www.shodan.io, 3 pages, downloaded Mar. 1, 2021.
Tran et al., "Searching the Web of Things: State of the Art, Challenges, and Solutions." *ACM Computing Surveys* 0(0)(01), 34 pages (Jan. 2017).
Vellaithurai et al., "CPIndex: Cyber-Physical Vulnerability Assessment for Power-Grid Infrastructures," *IEEE Transactions on Smart Grid*, 6(2):566-575 (Mar. 2015).
Venkataramanan et al., "CP-SAM: Cyber-Physical Security Assessment Metric for Monitoring Microgrid Resiliency," *IEEE Transactions on Smart Grid*, 11(2):1055-1065 (Mar. 2020).
American National Standards Institute/International Society of Automation, ANSI/ISA-99.03.3-2013, Security for Industrial Automation and Control Systems: System Security Requirements and Security Levels: https://www.isa.org/templates/one-column.aspx?pageid=111294&productId=116785, 30 pages (Aug. 12, 2013).

(56) References Cited

OTHER PUBLICATIONS

"Analysis of the Cyber Attack on the Ukrainian Power Grid," Defense Use Case, Electricity Information Sharing and Analysis Center (E-ISAC), 29 pages (Mar. 18, 2016).
"Censys Search," Censys Labs, https://censys.io, 7 pages, downloaded Mar. 1, 2021.
Shemshadi et al., "Searching for the Internet of Things on the Web: Where It Is and What It Looks Like," https://arxiv.org.pdf/1607.06884v1.pdf, 11 pages (Jul. 23, 2016).
Zalewski "pof $v_3$ (version 3.09b))" https://lcamtuf.coredump.cx/p0f3/, 3 pages, downloaded Mar. 1, 2021.

* cited by examiner

| location | dict | 10 | {'city': NoneType, 'region_code': NoneType, 'area_code': NoneType, 'longi... |
| --- | --- | --- | --- |
| opts | dict | 1 | {'modbus': [{...}, {...}, {...}, {...}, ...]} |
| org | str | 1 | Mobile HSDPA Internet Plus Services Coslada Site |
| os | NoneType | 1 | NoneType object of builtins module |
| port | int | 1 | 502 |
| product | str | 1 | <Vendor> PLC |
| tags | list | 1 | ['ics'] |
| timestamp | str | 1 | 2018-10-23T17:14:44.399814 |
| transport | str | 1 | tcp |
| version | str | 1 | v2.5 |

FIG. 3

```
Device No: 1,    CVE ID = CVE-2012-2336  (5.0, 'Medium', '(AV:N/AC:L/Au:N/C:N/I:N/A:P)')
Device No: 1,    CVE ID = CVE-2009-4143  (10.0, 'high', '(AV:N/AC:L/Au:N/C:C/I:C/A:C)')
Device No: 1,    CVE ID = CVE-2009-4142  (4.3, 'Medium', '(AV:N/AC:M/Au:N/C:N/I:P/A:N)')
Device No: 1,    CVE ID = CVE-2009-4018  (7.5, 'high', '(AV:N/AC:L/Au:N/C:P/I:P/A:P)')
Device No: 1,    CVE ID = CVE-2009-3293  (7.5, 'high', '(AV:N/AC:L/Au:N/C:P/I:P/A:P)')
Device No: 1,    CVE ID = CVE-2012-0788  (5.0, 'Medium', '(AV:N/AC:L/Au:N/C:N/I:N/A:P)')
Device No: 1,    CVE ID = CVE-2013-2110  (5.0, 'Medium', '(AV:N/AC:L/Au:N/C:N/I:N/A:P)')
Device No: 1,    CVE ID = CVE-2012-3499  (4.3, 'Medium', '(AV:N/AC:M/Au:N/C:N/I:P/A:N)')
Device No: 1,    CVE ID = CVE-2012-0031  (4.6, 'Medium', '(AV:L/AC:L/Au:N/C:P/I:P/A:P)')
Device No: 1,    CVE ID = CVE-2008-2829  (5.0, 'Medium', '(AV:N/AC:L/Au:N/C:N/I:N/A:P)')
Device No: 1,    CVE ID = CVE-2012-2386  (7.5, 'high', '(AV:N/AC:L/Au:N/C:P/I:P/A:P)')
Device No: 1,    CVE ID = CVE-2008-5814  (2.6, 'low', '(AV:N/AC:H/Au:N/C:N/I:P/A:N)')
Device No: 1,    CVE ID = CVE-2012-0057  (6.4, 'Medium', '(AV:N/AC:L/Au:N/C:P/I:P/A:N)')
Device No: 1,    CVE ID = CVE-2012-0789  (5.0, 'Medium', '(AV:N/AC:L/Au:N/C:N/I:M/A:P)')
Device No: 1,    CVE ID = CVE-2017-16642 (5.0, 'Medium', '(AV:N/AC:L/Au:N/C:P/I:N/A:N)')
Device No: 2,    CVE ID = CVE-2018-15473 (5.0, 'Medium', '(AV:N/AC:L/Au:N/C:P/I:N/A:N)')
Device No: 2,    CVE ID = CVE-2017-15906 (5.0, 'Medium', '(AV:N/AC:L/Au:N/C:N/I:P/A:N)')
Device No: 3,    CVE ID = CVE-2018-15473 (5.0, 'Medium', '(AV:N/AC:L/Au:N/C:P/I:N/A:N)')
Device No: 3,    CVE ID = CVE-2017-15906 (5.0, 'Medium', '(AV:N/AC:L/Au:N/C:N/I:P/A:N)')
Device No: 4,    CVE ID = CVE-2018-15473 (5.0, 'Medium', '(AV:N/AC:L/Au:N/C:P/I:N/A:N)')
Device No: 4,    CVE ID = CVE-2017-15906 (5.0, 'Medium', '(AV:N/AC:L/Au:N/C:N/I:P/A:N)')
```
FIG. 4

```
C:\Users\touh932\Desktop\PNNL_WORK\shodan_code\MEEDS code\nvd_data\nvdcve-1.0-2017.json
C:\Users\touh932\Desktop\PNNL_WORK\shodan_code\MEEDS code\nvd_data\nvdcve-1.0-2018.json
C:\Users\touh932\Desktop\PNNL_WORK\shodan_code\MEEDS code\nvd_data\nvdcve-1.0-modified.json
C:\Users\touh932\Desktop\PNNL_WORK\shodan_code\MEEDS code\nvd_data\nvdcve-1.0-recent.json
Device No: 1,  CVE ID = CVE-2018-15473 (5.0, 'Medium', '(AV:N/AC:L/Au:N/C:P/I:N/A:N)')
Device No: 1,  CVE ID = CVE-2017-15906 (5.0, 'Medium', '(AV:N/AC:L/Au:N/C:N/I:P/A:N)')
Device No: 2,  CVE ID = CVE-2018-15473 (5.0, 'Medium', '(AV:N/AC:L/Au:N/C:P/I:N/A:N)')
Device No: 2,  CVE ID = CVE-2017-15906 (5.0, 'Medium', '(AV:N/AC:L/Au:N/C:N/I:P/A:N)')
Device No: 3,  CVE ID = CVE-2018-15473 (5.0, 'Medium', '(AV:N/AC:L/Au:N/C:P/I:N/A:N)')
Device No: 3,  CVE ID = CVE-2017-15906 (5.0, 'Medium', '(AV:N/AC:L/Au:N/C:N/I:P/A:N)')
```
FIG. 5

```
Device No: 1,    CVE ID = CVE-2017-3167  (7.5, 'high', '(AV:N/AC:L/Au:N/C:P/I:P/A:P)')
Device No: 1,    CVE ID = CVE-2017-9798  (5.0, 'Medium', '(AV:N/AC:L/Au:N/C:P/I:N/A:N)')
Device No: 1,    CVE ID = CVE-2017-3169  (7.5, 'high', '(AV:N/AC:L/Au:N/C:P/I:P/A:P)')
Device No: 1,    CVE ID = CVE-2016-2161  (5.0, 'Medium', '(AV:N/AC:L/Au:N/C:P/I:N/A:N)')
Device No: 1,    CVE ID = CVE-2016-8612  (3.3, 'low', '(AV:A/AC:L/Au:N/C:N/I:N/A:P)')
Device No: 1,    CVE ID = CVE-2016-4975  (4.3, 'Medium', '(AV:N/AC:M/Au:N/C:N/I:P/A:N)')
Device No: 1,    CVE ID = CVE-2018-1283  (3.5, 'low', '(AV:N/AC:N/Au:S/C:N/I:P/A:N)')
Device No: 1,    CVE ID = CVE-2017-16642 (5.0, 'Medium', '(AV:N/AC:L/Au:N/C:P/I:N/A:N)')
Device No: 1,    CVE ID = CVE-2016-8743  (5.0, 'Medium', '(AV:N/AC:L/Au:N/C:N/I:P/A:N)')
Device No: 1,    CVE ID = CVE-2018-15132 (5.0, 'Medium', '(AV:N/AC:L/Au:N/C:P/I:N/A:N)')
```
FIG. 6

| Banner Property | Shodan | BinaryEdge | Censys |
|---|---|---|---|
| Service | shodan.module | type | protocols |
| Product | product | product | metadata.product |
| CPE | cpe | cpe.keyword | n/a |
| Device Type | device | device | metadata.device_type |
| Port | port | port | ports |
| Tags | tag | tag | tags |
| Operating System | os | ostype | metadata.os |
| IP Address | ip | ip | ip |
| Manufacturer | n/a | n/a | metadata.manufacturer |
| Vulnerabilities | vuln | bluekeep.vuln | n/a |

FIG. 12

MITIGATION OF EXTERNAL EXPOSURE OF ENERGY DELIVERY SYSTEMS

CROSS REFERENCE TO RELATED APPLICATION

This application claims priority to U.S. Provisional Patent Application No. 62/946,269, filed Dec. 10, 2019, and is incorporated herein by reference.

ACKNOWLEDGMENT OF GOVERNMENT SUPPORT

This invention was made with Government support under Contract DE-AC0576RL01830 awarded by the U.S. Department of Energy. The Government has certain rights in the invention.

FIELD

The disclosure pertains to cybersecurity.

BACKGROUND

Operational technology (OT) is increasingly being connected to facilitate remote control and coordination, increased performance, physical security, productivity, optimized energy management, and many more functions. Examples of OT include devices such as programmable logic controllers (PLCs) and supervisory control and data acquisition (SCADA) systems. These OT systems present in the electricity infrastructure are frequently referred to as energy delivery systems (EDS). However, the advent of connected technologies is causing the convergence of the traditional information technology (IT) and OT systems, increasing the overall risk for critical infrastructure systems such as the power grid.

Securing the power grid from complex, nonlinear, and evolving cyber threats requires continuous monitoring to identify, detect, and respond to threats and vulnerabilities of critical cyber assets. EDS devices are often inadvertently exposed to the public-facing internet, which can create vulnerabilities in one or more devices. Threat actors can exploit these vulnerabilities to gain access to the utility network. Once inside the utility network, the adversary can execute commands or control actions intended to cause faulty operation or damage to the system.

In 2014, researchers discovered more than two million control system devices directly connected to the internet. These exposures can be exploited by adversaries to initiate adverse events and cyberattacks to disrupt operations, cause equipment malfunction or damage, or even cause personnel injury and loss of life. Time after time, it has been evident that EDSs are becoming a prime target for cyberattacks. This can be observed from cyber incidents such as those reported in Ukraine in December 2015 and December 2016. The convergence of OT and IT systems resulted a need for enhanced monitoring, control, visibility, and flexibility in EDS operation.

Recently, researchers have been adopting different existing frameworks and standards such as the Cybersecurity Capability Maturity Model (C2M2), National Institute of Standards and Technology (NIST) Cybersecurity Framework (CSF), Cyber Security Evaluation Tool (CSET®), International Organization for Standardization and International Electrotechnical Commission (ISO/IEC) Standard 31010 to address the cybersecurity gap in OT systems. In all these frameworks, risk assessment is a missing piece that is required to evaluate the risks associated with critical infrastructure facilities. So, there is an urgent need to develop a risk assessment framework for internet-facing EDSs that utilities can use within their electronic perimeter and implement timely responses for mitigating cyber risks.

SUMMARY

According to an aspect of the disclosed technology, methods include receiving banner information from one or more queries of a network connecting a set of devices, wherein the banner information of one or more of the devices includes common vulnerability and exposure identifiers (CVEs) and the banner information of one or more of the devices does not include a CVE, identifying the devices based on the banner information including classifying devices without known CVEs by a device type, determining vulnerability scores for the devices with known CVEs based on retrieved CVE information, and determining vulnerability scores for the devices without CVEs based on a series of exploitability and impact parameter estimates associated with the device type classifications. Some examples further include estimating a cyberattack vulnerability risk for the devices using the determined vulnerability scores. In some examples, the estimating the cyberattack vulnerability risk further includes categorizing the devices into different risk categories according to predetermined ranges of the vulnerability scores. In some examples, the estimating the cyberattack vulnerability risk for a device includes calculating an aggregate weighted vulnerability score. Some examples further include estimating cyberattack vulnerability risks for a subset of the set of devices based a selectable filter attribute. In some examples, the classifying the devices by device type includes comparing the device banner information to a regular expression dictionary linking banner information to device types, and selecting as the device type a highest confidence level output from one or more comparison outputs. In some examples, the regular expression dictionary includes signatures linking banner information patterns with device types based on a data value attribute, a version, a common weakness enumeration (CWE), or a combination thereof. In some examples, the classifying the device type includes removing false positives. In some examples, the device types include one or more of the following device types: programmable logic controller (PLC), remote terminal unit (RTU), supervisory control and data acquisition (SCADA), smart inverter, relay. In some examples, each vulnerability score includes a common vulnerability scoring system (CVSS) vector string and a scalar value. Some examples further include displaying to a user one or more of the vulnerability scores or a risk estimate based on the vulnerability scores. Some examples further include displaying to a user a graphical representation of an estimated cyberattack vulnerability risk posture for the set of devices, wherein the graphical representation includes a plurality of extensions each having an extension amount associated with a weighted average across vulnerability scores for one of the exploitability and impact parameters. Some examples further include re-determining the vulnerability scores after automatically retrieving updated CVE data from an external CVE authority database. Some examples further comprising tracking and recording a history of the determined vulnerability scores or risk estimates associated with the determined vulnerability scores, and displaying the history to a user. Some examples further include periodically repeating steps to identify new devices exposed on the network. Some examples further include periodically repeating steps and notifying a user when cyberattack vulnerability risk changes in relation to one or more thresholds after a re-estimation. Some examples further include predicting an attack pathway to the network by: comparing the determined vulnerability score for a device without a CVE in its banner information to CVSS scores on an external CVSS authority database to determine one or more matching CVSS scores, retrieving CVEs associated with the matching CVSS score, and removing CVEs not associated with the device type.

According to another aspect of the disclosed technology, methods include classifying a device type for a device having unknown common vulnerabilities and exposures (CVEs) by comparing device banner information to device type patterns of a regular expression dictionary and selecting as the device type the comparison output having the highest confidence level, and estimating a cyberattack vulnerability of the device based on an attack progression series of exploitability and impact parameter estimates associated with the device type classification. Some examples further include calculating a risk score for the device based on the cyberattack vulnerability estimation.

According to another aspect of the disclosed technology, apparatus include a processor and memory configured with processor-executable instructions which, when executed by the processor, cause the processor to: receive banner information from one or more queries of a network connecting a set of devices, wherein the banner information of one or more of the devices includes common vulnerability and exposure identifiers (CVEs) and the banner information of one or more of the devices does not include a CVE, identify the devices based on the banner information including classifying devices without known CVEs by a device type, determine vulnerability scores for the devices with known CVEs based on retrieved CVE information, and determine vulnerability scores for the devices without CVEs based on a series of exploitability and impact parameter estimates associated with the device type classifications. In some examples, the memory is further configured with processor-executable instructions to estimate a cyberattack vulnerability risk for the devices using the determined vulnerability scores.

According to a further aspect of the disclosed technology, a computer readable medium includes instructions for performing any method described herein.

According to another aspect of the disclosed technology, methods include selecting a search query term, querying a spider database with the selected search term and retrieving banner information from the query results, creating false-positive signatures by (i) parsing banner data of the results for a first property and creating list of known false-positives from the devices not matching the first property, (ii) parsing a second property of the remaining banners to create a frequency list for expressions, and (iii) adding expressions to the false-positives list where a list item corresponds to a banner matching for the same device, and creating positive signatures by (i) removing all banners that contain a false-positive signature, (ii) repeating the parsing process used to create false-positive signatures, (iii) removing banners with a known positive signature, and (iv) repeating the querying, creating false-positive signatures, and creating positive signatures (i)-(iii) until more than a predetermined sufficiency percentage of the banners have a signature for the selected search term. In some examples, the first property is a 'product' property of the banner and the second property is a 'data' property of the banner. In some examples, the predetermined sufficiency percentage is 95%. Some examples further include applying signatures to classify a device by: querying a spider database with the selected search term, removing each banner having a false-positive signature, and comparing each remaining banner with a list of positive signatures and classifying each banner with a found positive signature. Some examples further include querying one or more other spider databases to determine a search result intersection and revising search terms to produce query results with a more complete search result intersection.

The foregoing and other objects, features, and advantages of the disclosed technology will become more apparent from the following detailed description, which proceeds with reference to the accompanying figures.

BRIEF DESCRIPTION OF THE DRAWINGS

FIG. 3 is a snapshot of banner data retrieved through a spider query.

FIGS. 4-6 are snapshots of query results.

FIG. 5 is a create configuration window.

FIG. 6 is a save configuration window.

FIG. 12 is a mapping of query properties between different spider databases.

DETAILED DESCRIPTION

Introduction

Figure 1:
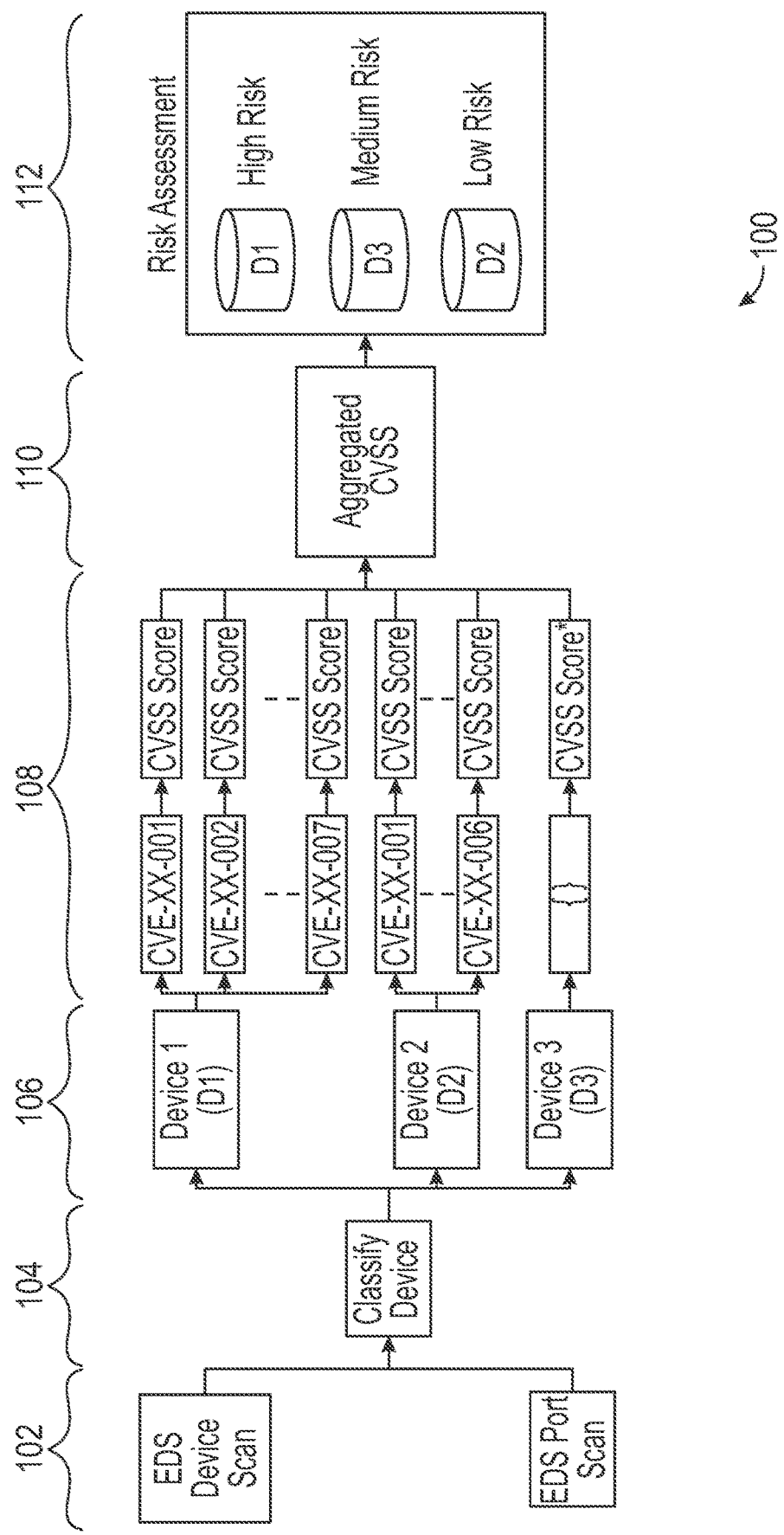
FIG. 1 is a schematic of an example framework for providing cybersecurity vulnerability assessment and monitoring.

It can be important to continuously monitor and detect any exposed or misconfigured devices so that owners, operators of EDS, and the associated utility can mitigate potential cyber risks. In response to the above challenges, disclosed examples herein can provide Mitigation of External Exposure of Energy Delivery Systems (MEEDS) as well as other systems, to help critical infrastructure owners identify exposed and vulnerable OT systems.

Securing the power grid from complex, non-linear, and evolving cyber threats can require continuous monitoring to identify, detect, and respond to threats and vulnerabilities of critical cyber assets. Energy distribution system (EDS) devices are often inadvertently exposed to the public-facing internet, which can possibly result in one or more devices with vulnerabilities. Threat actors can exploit these vulnerabilities to gain access to an energy (or other) utility network. Once inside the utility network, the adversary can execute commands or control actions intended to cause faulty operation or damage to the system. It can benefit safe operational goals to continuously monitor and detect any exposed or misconfigured devices so that potential cyber-risks can be mitigated by owners and operators of EDS or other utilities. Disclosed examples can provide effective cyber risk management systems for resource constrained energy utilities that lack the technology or sophistication to secure both critical and non-critical systems.

Disclosed examples include web-based dashboard applications that are built on or use existing existing cybersecurity databases or other continuous cybersecurity monitoring technology with the capability to improve cyber risk mitigation and management. MEEDS has a number of innovative features to empower utility owners and operators, enabling them to continuously passively scan their internal network and query externally exposed assets to identify and mitigate cyber risks to energy delivery systems (EDS) and connected critical cyber assets exposed to the public internet. This capability can provide an advanced cyber defense technology both internally and externally to mitigate potential cyber risks without degradation or disruption of critical EDS or other utilities.

Disclosed examples include web-based dashboard applications built on existing Shodan or other cybersecurity technology to perform continuous monitoring to detect and identify EDS or other utility equipment that may be exposed to the public internet. Shodan, an open source intelligence tool, can quickly find internet facing systems by protocol or type. Disclosed examples can enable energy and other utilities to proactively respond to this information and secure their networks by mitigating risks arising due to exposed and vulnerable devices both internally as well as externally.

Disclosed examples can be configured to identify exposed devices quickly upon initial visibility, safely scanning/querying EDS devices, and providing situational risk awareness to resource-constrained utilities in a way that does not require deep technical expertise or extensive resources, including by being able to be adapted and tailored to meet the needs of nontechnical operators who do not have a cybersecurity background. For example, while Shodan can enable users to find devices connected to the internet through the use of different filters, it also currently requires some technical prowess to identify and mitigate exposed EDS. Disclosed examples can facilitate the rapid identification of exposed EDS for nontechnical personnel. Currently, interpreting the meaning of the data and the inherent risk in the data might be a challenge for small, resource-constrained utilities where the staff might not readily have the technical know-how to take advantage of Shodan's capabilities to assess their organizations' security posture.

Disclosed examples can integrate with web spider databases such as Shodan and others to detect and identify EDS or other utility equipment that may be exposed to the public internet. Example software architectures can enable utilities to proactively respond to this information and to secure networks by mitigating risks associated with exposed and vulnerable devices, both internally and externally. In some examples, built-in relative risk assessment methods can be used to estimate risk levels for the detected exposures. Relative risk assessment frameworks can be used to analyze network characteristics and communication pathways of publicly exposed EDSs and leverage use vulnerability calculations based on approaches developed by the National Institute of Standards and Technology (NIST). In particular, disclosed examples can dynamically construct risk metrics for EDS devices from service banners. Frameworks can operate without requiring direct interaction with the inspected services, which can ensure identification of externally exposed devices without affecting EDS OT operations.

Disclosed examples can provide an interface for advanced analytics and can be integrated with a number of open source vulnerability databases and web crawling systems. Methodologies, processes, and frameworks can be used to identify vulnerable devices and systems, and can include valuable information that can help end users prioritize mitigation, including type of the system, ports, associated vulnerabilities and potential impact if vulnerabilities are exploited, etc.

Securing the power grid from complex, non-linear, and evolving cyber threats requires continuous monitoring to identify, detect, and respond to threats and vulnerabilities of critical cyber assets. OT, ICS, EDS devices are often inadvertently exposed to the public-facing internet. Threat actors can exploit these vulnerabilities to gain access to critical networks and systems. Once inside the utility network, the adversary can execute commands or control actions intended to cause faulty operation or damage to the system. Thus, disclosed examples can be configured to continuously monitor and detect any exposed and vulnerable devices so that owners, operators of EDS and the concerned utility can mitigate potential cybersecurity risks. Similarly, policy makers, vendors and regulators can used disclosed examples to develop safeguards, policies and regulations that are commensurate with current cyber risk landscape as interface examples can display results by device, vulnerability, and geography. As a result, framework examples can provide an effective, affordable, and easy to use cyber risk management system designed specifically for resource constrained energy utilities that lack the technology or expertise to secure their most critical systems.

Disclosed examples include methodologies, frameworks, architectures, and web-based interfaces to perform continuous monitoring to detect and identify vulnerable EDS, IoT, OT and ICS. Examples can be configured to ingest API calls from other open source vulnerability databases and web crawlers. While examples of the disclosed technology can find successful application to secure energy utilities, they can also be used proactively by any owners of other critical infrastructure, from transportation to hospitals, to respond to vulnerabilities and secure their networks by mitigating risks arising due to the exposed and vulnerable devices both internally as well as externally.

Overview of Web Spiders

Web spiders include proprietary and open-source software systems connected to web-based search engines and databases. Web spiders facilitate discovery of thousands of internet-facing information communication technologies, including vulnerable internet-facing EDSs. These web spiders sort the discovered information into categories associated with the device's banner and stores that data in their respective databases. Web spiders often include a filters attribute that can enumerate common vulnerabilities in legacy and misconfigured industrial control systems (ICSs)/EDSs, such as use of default usernames and passwords, weak encryption, lack of encryption and authentication, lack of authentication in the Ethernet/IP, etc. Attackers can take advantage of web spiders and cyberattack techniques (such as using search engine and similar software/applications to discover security gaps or vulnerabilities in software and system configuration) to illegally gain access to OT networks. However, disclosed examples can use such data sources to proactively discover exposures and mitigate the discovered exposures before cyber attackers can attempt malicious actions. Representative examples use application programming interfaces (APIs) of web spiders to extract information from associated databases. Using these API connections, disclosed examples can generate detailed cybersecurity vulnerability reports, provide near-real-time alerts, and keep track of historical results.

Shodan is an internet intelligence organization that collects information about devices that are publicly available on the Internet, including EDSs that are part of the U.S. power grid infrastructure. The resulting data is made available through a web-based search engine, a developer API, and an enterprise platform. The main unit of data that Shodan gathers from a device is the banner, which contains information about the device such as operating system, software, and geographic location. The information can be used to determine the purpose and function of a specific device.

To use the Shodan search engine, a technical user is expected to have knowledge of banners, ports, and services to obtain to obtain information about relevant connected devices facing the public internet. When queried, the Shodan search engine taps its database to generate responses. The search engine is a query-based system that uses the existing information already stored in its database. The search filters can enumerate common vulnerabilities in legacy and misconfigured ICSs/EDSs (e.g., weak encryption or lack of encryption and authentication). A knowledgeable user with enterprise access can use custom queries to enumerate critical systems that have vulnerabilities and are susceptible to cyber exploitation. The user can employ those capabilities to monitor their internet-facing infrastructure and strengthen their cyber defenses.

Project SHINE (SHodan INtelligence Extraction) was designed to catalog internet-facing SCADA and EDS devices. Project development started in mid-2008 and ended in 2014; SHINE found more than 2 million control system devices directly connected to the internet. Project SHINE built Shodan search queries using the names of 182 SCADA suppliers and related leading products. The project discovered multiple SCADA and EDS devices from over 60 vendors worldwide. It reportedly discovered some 2000 to 8000 new exposed devices each day. Suitable and meaningful search terms to identify control system devices from their meta-data were used to extract information about the devices that were directly exposed to the public internet. These devices included traditional SCADA/EDS equipment, such as remote terminal units (RTUs), PLCs, intelligent electronic devices (IEDs)/sensor equipment, SCADA/human-machine interface (HMI) servers, distributed control systems, and other nontraditional SCADA/EDS devices. Many of the discovered devices also revealed their hardware and firmware metadata, which could provide information about the documented security flaws associated with the devices. The level of vulnerabilities and the criticality of the systems were not validated.

Expanse Inc's "Expander" system continuously monitors the internet to collect information about all public-internet connected devices but is closed to the general public. Expander scans the public internet looking for exposed devices, and alerts its customers about rogue or unprotected devices quickly after finding them. Digital assets are displayed on a map to show the true network boundary and inform the customer of other exposures. Although the product can see all the connected devices, it shows only the devices that are on the customer's network and not on other networks. This is to prevent any kind of malicious use of the gathered information. Expanse's product is a software-as-a-service, web-based product that also offers customer-specific application programming interface (API) integration.

Censys is a cloud-based service that continually scans the public address space and provides an up-to-date snapshot of the hosts and services running across the public Internet Protocol version 4 (IPv4) address space through a search engine and API. The search results provide information about the devices that respond, including details about their software or configuration. Censys produces structured data about each host and protocol, which are post-processed to enable researchers to programmatically define additional attributes that identify device models and tag security-relevant properties of each host. Search queries using software- or configuration-related details about a new security flaw can reveal how widespread it is, and provide information about the devices that are identified as affected by the flaw. Censys centralizes the mechanical aspects of scanning to expose data to researchers through a public search engine, Representational State Transfer (REST) API, publicly accessible tables on Google BigQuery, and downloadable data.

Reposify is a search engine that, by performing HTTP requests, can provide insight into a multitude of devices that may be connected to the public internet. The search engine is based on a custom API that not only discovers new devices, but can also determine what inherent vulnerabilities the connected devices may have. Reposify can also determine a device's relationship with other devices and people, and whether other technologies may be connected, such as an operating system, a database, or a web server. The queries generated using Reposify are limited to the address range provided and specific ports and protocols. Only one query request can be active at one time, which limits the number of requests, and there is a maximum of 65,536 unique addresses per query.

Thingful is a search engine that shows the locations of data-emitting devices on an interactive map, and provides information about the types of data these devices emit and the online conversations that arise around them. The devices are grouped into categories, such as transportation, energy, or residential. Unlike the other internet search engines described previously, Thingful builds its data set from sensor data sources on the web instead of pinging public IPv4 addresses. The Thingful application is limited in that the access to its data is provided only via a dedicated user interface, and it does not provide information about SCADA/EDS devices in any of its queries.

Overview of CVE and CVSS

The Common Vulnerability Scoring System (CVSS) is a vulnerability evaluation and scoring system developed by FIRST (Forum of Incident Response and Security Teams) that quantitatively evaluates system vulnerability. The CVSS considers known vulnerabilities in devices (known as Common Vulnerabilities and Exposures, or CVEs) and tries to assess the effect of the vulnerability by looking at parameters such as complexity of attack vector, confidentiality, integrity, and availability impacts. The CVSS score has three metric groups: base, temporal, and environmental.

The "base" metric group quantifies the intrinsic characteristics of a vulnerability in term of two sub-scores: exploitability sub-score and impact sub-score. The base metric attributes can be collected from the information provided by product vendors, where the vulnerability has been discovered. Unlike temporal and environmental score attributes, the base score attributes are constant across different user environments and time points. The CVSS base score can be calculated as follows:

$$\text{Base Score} = \text{round\_to\_1}(((0.6*\text{Impact}) + (0.4*\text{Exploitability}) - 1.5) * f(\text{Impact})) \qquad (1)$$

The Impact portion of the calculation in equation 1 is based on confidentiality, availability, and integrity factors, and the Exploitability portion is based on access vector, access complexity, and authentication factors. The CVSS base scores can range from 0 to 10, with 0 indicating a threat of a lowest significance and 10 indicating a threat of a highest significance. Qualitative severity rankings of "Low," "Medium," and "High" for CVSS base score ranges are provided by the National Vulnerability Database (NVD) and are shown in Table I.

TABLE I

NVD VULNERABILITY SEVERITY
RATING FOR CVSS BASE SCORE
CVSS Base Score Rating

| Severity | Base Score Range |
|---|---|
| Low | 0.00-3.9 |
| Medium | 4.0-6.9 |
| High | 7.0-10.0 |

Overview of Disclosed Technology

Risk assessment can be an important component of risk management. For an energy utility, risk assessment involves identifying, quantifying, and prioritizing EDS device security risks in the OT network. By conducting a risk assessment that targets an externally exposed EDS, energy utilities can determine the overall vulnerability of their devices and develop prioritized mitigation strategies. Similar assessments can be made with other utilities and OT networks. As stated in the previous section, web spiders extract an array of system-specific parameters by retrieving device banner information. Disclosed examples can use some of banner parameters (discussed further hereinafter) to perform relative-risk analysis. Disclosed EDS risk assessment frameworks perform an in-memory mapping of CVE entries that are found by querying the web spider databases. To achieve this, the frameworks can compile a list of known exposed EDS devices and their CVE IDs into a single input file by retrieving and processing data from the national vulnerability database (NVD) in near-real-time. Relative risks can be calculated by categorizing exposed EDS devices in an OT network according to their respective CVSS scores.

An example framework 100 is shown in FIG. 1 which can calculate risk assessment for an energy utility by categorizing exposed EDS devices in an OT network according to their respective CVSS scores. The framework 100 can be generally referred to as a Mitigation of External Exposure of Energy Delivery Systems (MEEDS) framework, though it will be appreciated that disclosed techniques can be applied in other utilities, organizations, and OT systems. Device categorizations can provide information regarding network characteristics and communication pathways. In some examples, multiple EDS devices (e.g., PLC, RTU, SCADA) can be queried at 102 through framework subroutines, by using web spider databases and national vulnerability databases as data sources in a back end of the framework 100 to gather banner information of the exposed devices. The framework 100 can make data retrieval calls using the application programming interfaces (APIs) of those external sources through various open ports on the system that runs the framework 100. For example, MEEDS queries executed through HTTPS calls can use open port 43 to execute the queries and receive the data from the external sources. A classification is done at 104 to identify whether the exposed banner information is from an EDS, e.g., to eliminate false positives, producing a list of devices 106. At 108, from those identified device banners, banners with CVE IDs can be extracted. Not all of the exposed device banners may have CVEs (such as "Device 3"), and some banners can include multiple CVEs. In the absence of a CVE ID, a CVSS score approximation, including vector string, can be calculated using Equation 1 using the banner information returned by the web spider queries. At 110, an aggregated CVSS score can be calculated for the discovered devices, which can correspond to a cyberattack vulnerability risk estimate, and devices can be further categorized at 112 into respective risk categories.

Web spiders perform an intensive, per-target scan on physical (Open Systems Interconnection [OSI] layer 1) devices, network (OSI layer 3) protocols, and transport (OSI layer 4) protocols. Some web-spider-scan APIs evaluate two scanning configurations: (1) an EDS port scan and (2) an EDS device scan. These two scanning configurations scan the EDS network immediately upon request by using the on-demand scanning capabilities of the API. Table II lists the queries from those two scan API configurations.

TABLE II

STANDARD PORT CONFIGURATION QUERIES

| EDS Port Scan | | EDS Device Scan |
|---|---|---|
| Port | Service | Devices |
| 21 | FTP | PLC |
| 22 | SSH | RTU |
| 23 | Telnet | SCADA |
| 502 | Modbus TCP | HMI |
| 102 | S7/MMS/ICCP/IEC 61850 | PAC |
| 4712 | C37.118 | Relay |
| 4840 | OPC | DNS |
| 20000 | DNP3 | Smart Meter |

Querying through the framework 100 generates potential device banners. However, those banners are not always related to EDS ports. For example, for queries such as "PLC," generated results can include http and ftp banner information that is not directly related to a programmable logic controller (PLC). Instead, the information can refer to the handshaking process and related data pertaining to the PLC. Device categorization at 104 can be used to eliminate banners that are not related to EDSs.

Figure 2:
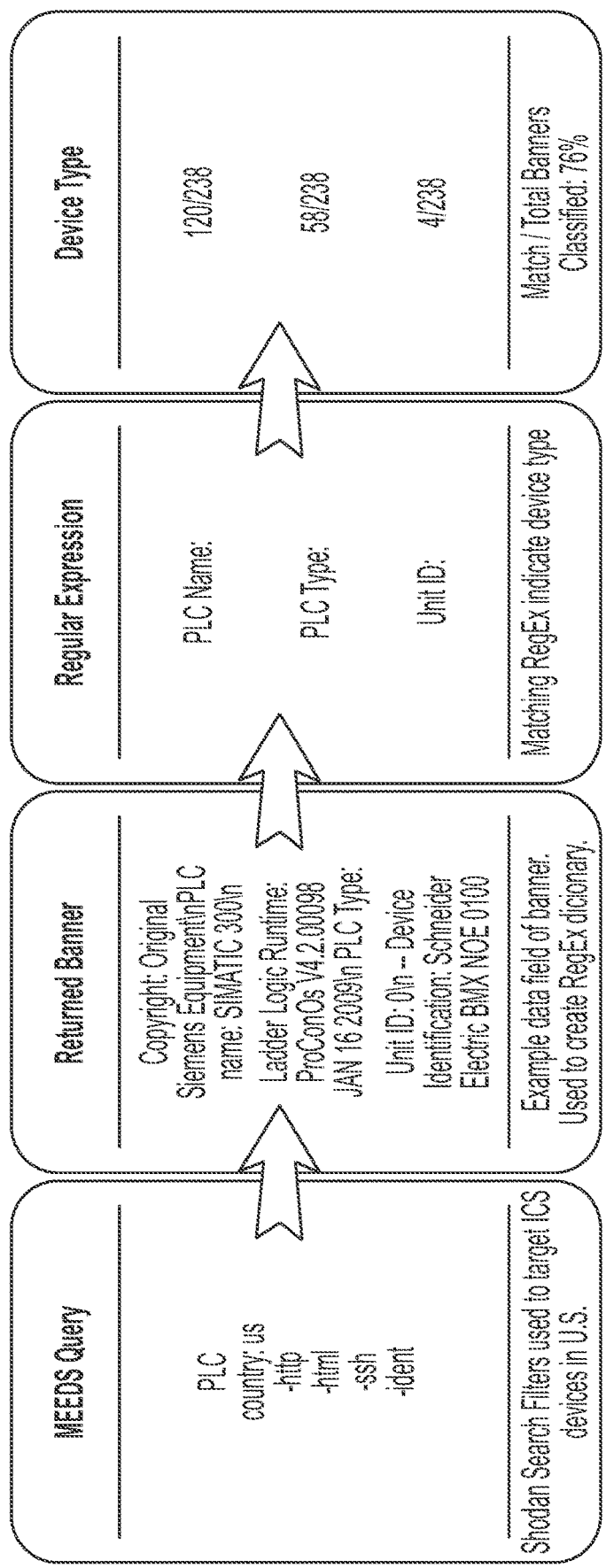
FIG. 2 is a schematic of an example device classification methodology.

In some examples, classifying a device type based on its banner information can be achieved using regular expressions (RegEx) dictionary to filter banner results. For example, the data value attribute of the banner can be used in RegEx comparisons, as it can contain information that is uniquely indicative of a device type. In representative examples, frameworks are configured so that devices (with or without a CVE) are not categorized with a device type if the RegEx comparison does not produce a match in metadata of a banner of the associated device. False positives can be eliminated or reduced by issuing search terms that are multifaceted and distinctive to a targeted banner. Search filters can be applied to the queries to limit/scope the results related to the exposed devices, and the data fields of the returned banners can be queried using a RegEx dictionary. RegEx terms of the targeted device type can be used to query the banners, for example, in a sequential order of dictionary entries using a tiered approach. A banner classification can be determined to be complete upon a successful match, although succeeding RegEx queries could also match. Search terms can be created and combined to produce a RegEx sub-dictionary for each device type by examining the data properties of the banners and identifying consistent and unique properties. FIG. 2 shows an example of device classification methodology for a PLC query. In this case, a total of 238 banners were found. From those banners, 120 banners have RegEx "PLC Name:", 58 banners have RegEx "PLC Type:", and 4 banners have RegEx "Unit ID:". Hence, out of 238 exposed banners, 182 are related to a PLC.

To identify CVEs, the banner information of the detected (potentially exposed) devices of the EDS or other utility is analyzed. In some examples, the framework 100 can check whether a banner has any CVEs, and if the CVEs are found, they can be used to query the National Vulnerability Database (NVD) to extract existing corresponding CVSS scores. The following represents pseudo-code example for determining CVSS scores for devices based on their listed CVEs and associated NVD information.

---

MEEDS Risk Assessment Algorithm Pseudo-code

Input: (a) A list of NVD database file, x = {$NVD_{2006}$.json, $NVD_{2007}$.json, . . . , $NVD_{2019}$.json}
(b) A list of downloaded Shodan search queries, y = {PLC.json . . . . . , SCADA.json }
Output: The CVSS score and vector string of exposed EDS devices
Load and extract the entire CVE information from the NVD database
1.   For i in x:
3.       NVD = load the CVE item of json data;
3.       For j in number of NVD :
4.           Temp_score = Identify base score
5.           Vector = Identify vector string
6.           If Temp_score < 3.9, set Impact ='low';
7.           Else if Temp_score < 6.9, set 'medium';
8.           otherwise set 'high'
9.           Final_dictionary = (Temp_score, Impact, Impact)
     # Extract the Shodan queries data and identify the exposed OT devices with categorization
10.  For i in y:
11.      Attr = rear the Shodan data and split all the banner
12.      For j in number of Attr:
13.          If 'Vulns' in j: # check 'vulns' exists or not
14.              Value = Attr.append('Vulns')
15.              For i in number of vulns: # count number of exposed
16.                  If vulns = = Final_dictionary
17.                      Result = (i, Temp_score, Vector)
                 Else Value = Result # create vector string and get result
                 using
                         CVSS equation

---

As mentioned previously, not all banners will have CVEs, so CVSS scores cannot be extracted from numerous devices. For example, it is not uncommon for a utility working directly with a vendor to build a device that may not be generally available in the market and may not have an associated CVE even though the device may have cyberattack vulnerabilities nonetheless. To obtain CVSS scores of devices that do not have associated CVEs, disclosed examples can estimate a device vulnerability, generating a vector string and CVSS scalar by analyzing the metadata of the device banner.

In some disclosed examples, a CVSS vector strings can be constructed by analyzing the banner information and using six parameter estimates associated with device types or other factors obtained from the banner information. The following assigned values are illustrative and can be assigned and tailored by the end user according to their environment or system application. Some frameworks can be highly configurable to fit various EDS or other OT/utility environments. An Attack Vector (AV) parameter is a metric that reflects the process of vulnerability exploitation, i.e., that there is a way for an attacker to exploit the device. For example, the metric value "network (N)" indicates that the vulnerability can be exploited through network access. Because the exposed device is found through MEEDS, the vulnerability is remotely exploitable, and so framework examples always assign network (N) to the AV metric. An Attack Complexity (AC) parameter is a measure estimate of the complexity of the attack required to exploit the vulnerability once an attacker has gained access to the target system. For example, banner information can include a property/attribute called tag, and it can return a value such as VPN (referring to "virtual private network"), ICS (referring to "industrial control system"), etc. Thus, the tag property often describes a general purpose of the device. Because most ICS in the energy domain are strongly protected through firewalls and different types of security mechanisms, if the tag properties returns "ics" then the framework can assign high (H) to the AC parameter and if not it can assign low (L). Adjustments can be made to the AC parameter, e.g., based on different sets of firewall rules associated with different devices.

An Authentication (AU) parameter is a metric that measures the number of times an attacker must authenticate to a target in order to exploit a vulnerability. Framework examples can assume that a vulnerable command is only available after a single successful authentication and assigns Single (S) to the AU parameter of the CVSS vector. A Confidentiality parameter can refer to limiting information access and disclosure to only authorized users, as well as preventing access by, or disclosure to, unauthorized users. Framework examples can assign Low (L) to the C parameter portion of the CVSS vector, based on the assumption that in the EDS domain, unauthorized disclosure of information would be expected to have limited adverse effects on organizational operations, organizational assets, or individual. An Integrity parameter can be a metric that measures the effect on integrity of a successfully exploited vulnerability. Framework examples can assume that a complete loss of system protection will compromise the entire system, and therefore can assign Complete (C) to the I parameter portion of the CVSS vector.

An Availability parameter can refer to a loss of availability and corresponding disruption of access to or use of information or an information system. This metric measures the effect on availability of a successfully exploited vulnerability. In the OT domain, availability is typically assigned a highest priority to maintain system operations, and so framework examples can assign Complete (C) for the A portion of the vector. For example, an RTU is communicating with a relay and the relay is communicating with a circuit breaker, such that the relay would normally send a trip command to the circuit breaker under conditions. If an attacker has been able to proceed along an attack progression to obtain access to this particular relay, e.g., through the previous factors, the attacker can manipulate the trip command. This penetration compromises integrity such that it is completely lost, so that if a trip command would normally be sent by the relay, instead it is not sent, and the relay will never cause the circuit breaker to trip causing damage of equipment, power loss, etc. Conversely, if the system is operating normally, the attacker can control and cause the breaker to trip, causing a blackout. In various examples, the Availability parameter as well as other parameters can be assigned values based on different device type classifications (or sub-classifications) or other banner information, which can also be adjustable, user configurable, and/or updateable.

The following example scenario illustrates the process of CVSS string constructions using a framework example, such as the framework 100. FIG. 3 shows a snapshot of banner information of an exposed PLC device that does not contain any CVEs, and Table III describes the process for constructing a CVSS vector string by analyzing the exposed PLC banner information. The overall vector string of this banner is (AV:L/AC:H/Au:S/C:P/I:C/A:C) and the CVSS score is calculated as shown below:

Impact=10.41*(1−(1−0.275)*(1−0.666)*(1−0.666))= 9.53

Exploitability=20*0.395*0.35*0.56=1.5484

BaseScore=round$_{[0-1]}$(((0.6*9.53)+(0.4*1.5484)− 1.5)*1.176)=5.6

TABLE III

CREATE VECTOR STRING BY ANALYZING BANNER

| Vector | Metric Value | Metric Score | Explanation |
| --- | --- | --- | --- |
| AV | Network (N) | 1.0 | Modbus protocol uses Port 502 and this port is open in the Modbus server |
| AC | High (H) | 0.35 | The tag mentioned in this banner is "ICS"; therefore, it is strongly protected through the firewall and different types of security mechanisms. |
| AU | Single (S) | 0.56 | The PLC uses single authentication. |
| C | Partial (P) | 0.27 | Access to some system files is possible, but the attacker does not have any control over what is obtained |
| I | Complete (C) | 0.66 | Total compromise of system integrity |
| A | Complete (C) | 0.66 | Total shutdown of the affected PLC |

In representative examples, an exposed device that has multiple CVEs can be categorized into three vulnerability risk categorization buckets: high, medium, and low. This categorization is applied to the vulnerabilities of the exposed device based on the CVEs and does not evaluate the device as a whole. The CVEs found to be associated with a device are evaluated by their CVSS scores using a device risk categorization algorithm, which produces a weighted average CVSS score for the device. In some examples, the range of weighted arithmetic mean CVSS scores for low risk categorization can be 0.0-3.9; medium risk categorization can be 4.0-6.9; high risk categorization can be 7.0-10.0. The device risk categorization algorithm uses the following arithmetic mean formula:

$$R_d = \frac{\sum_{i=k}^{n}(y_i w_i)}{\sum_{i=k}^{n} y_i}$$

where y=count of CVSS score, w=weight of CVSS score (3.9, 6.9, 10.0), n=High categorization, and k=Low categorization.

Example Experiments

Several experiments were conducted to validate framework examples. Results of experiments and the associated data confirm that disclosed frameworks exhibit high performance in terms of execution time and the false/true positive rates. The experimental analysis mostly focused on PLCs, RTUs, and SCADA systems, because those are the most common and some of the most significant systems in an OT environment. Search terms that were used in the experimental queries are "PLC," "RTU," and "SCADA." FIGS. 4-6 show snapshots of redacted data generated from queries for PLC, RTU, and SCADA, respectively. A particular exposed device falling under a class (such as RTU, PLC, etc.) is named "device 1, device 2 . . . device n." Each device has a banner with zero or more CVEs. As can be seen from the figures, most exposed devices for a particular query contain multiple CVEs. For example, for PLC queries, device 1 contains 15 CVEs; four of them are rated high criticality, ten are rated medium criticality, and one is rated low criticality.

The extracted information is not associated with a specific network, geographical location, facility, vendor, or threat. The results of these queries were each stored in multiple JavaScript Object Notation (.JSON) files, resulting in approximately 100 different exposed devices per file. The CVEs associated with an exposed device are a field that the query results return along with the CVSS v2.0 base score. This CVSS v2.0 base score is then used to categorize the CVE by following the rating rubric shown in Table IV. To query CVEs in the NVD and gather the CVSS v2.0 vectors, a locally stored copy of NVD is loaded into a Python script to search the CVE.

Table IV shows the overall device criticality of the exposed device after aggregating all CVSS scores. Note that the table only represents PLC queries. After device classification, this framework identified a total of eight exposed PLCs out of 100 devices, and each of the exposed devices has multiple CVEs. Out of those eight exposed devices, five devices fall in the medium criticality range and three devices fall in the high criticality range.

TABLE IV

DEVICE CRITICALITY OF EXPOSED PLCS

| PLC Devices | Banners | No. Banner Criticalities According to CVSS v2 | | | Weighted Avg. Score | Device Criticality |
| --- | --- | --- | --- | --- | --- | --- |
| | | High | Med | Low | | |
| Device 1 | 15 | 4 | 10 | 1 | 7.52 | High |
| Device 2 | 6 | 2 | 1 | 3 | 6.43 | Medium |
| Device 3 | 5 | 3 | 2 | 0 | 8.76 | High |
| Device 4 | 4 | 0 | 1 | 3 | 4.65 | Medium |
| Device 5 | 2 | 0 | 1 | 1 | 5.40 | Medium |
| Device 6 | 3 | 2 | 1 | 0 | 8.95 | High |
| Device 7 | 2 | 0 | 2 | 0 | 6.9 | Medium |
| Device 8 | 10 | 2 | 6 | 3 | 6.20 | Medium |

Significantly, most of the exposed OT devices are critical towards maintaining secure operations. Therefore, the corresponding CVSS associated with the OT related vulnerabilities are often high enough to be categorized as medium or high. This pattern is also reflected in table IV where all the exposed PLC devices fall under the medium and high criticality categories.

During operation, web spiders typically query for the banner information of exposed devices through a scanning technique that reviews a target attribute via TCP (SYN, SYN-ACK, ACK) three-part hand-shaking. Depending on the type of web spiders or other method of banner grabbing, query tools may use nonintrusive, passive scanning or intrusive active scanning techniques. Nonintrusive scanning techniques have fewer negative effects on device functionality because allow a scanner to scan the network without interfering with the server or client. Also, the messages (i.e., banner information) of some of the web spider scanners are small, and therefore generally do not raise flags in EDS defense systems. By extracting the banner information from web spiders, disclosed framework examples can perform risk assessment of the externally exposed devices without affecting EDS OT operation.

Disclosed risk assessment framework examples can use data of exposed OT devices from multiple sources (web spiders, CVE, NVD, etc.) and calculate cybersecurity risk scores of the exposed devices in such a way that the device operators can easily understand which devices need to be prioritized for mitigating the exposures. For example, using the qualitative risk assessment and scoring frameworks disclosed herein, some of the risks associated with inadvertent OT exposures arising from IT and OT convergence can be addressed before cyberattacks occur. The nonintrusive process of enumerating the exposures can be used help the end users, particularly those that are not IT experts, to better manage the overall risk of an EDS, other utility, or other organizational network and help address outward vulnerabilities and exposures. As will be discussed further below, framework tools can also facilitate the implementation of a well-informed mitigation plan and can provide continuous monitoring of a network.

Figure 7:
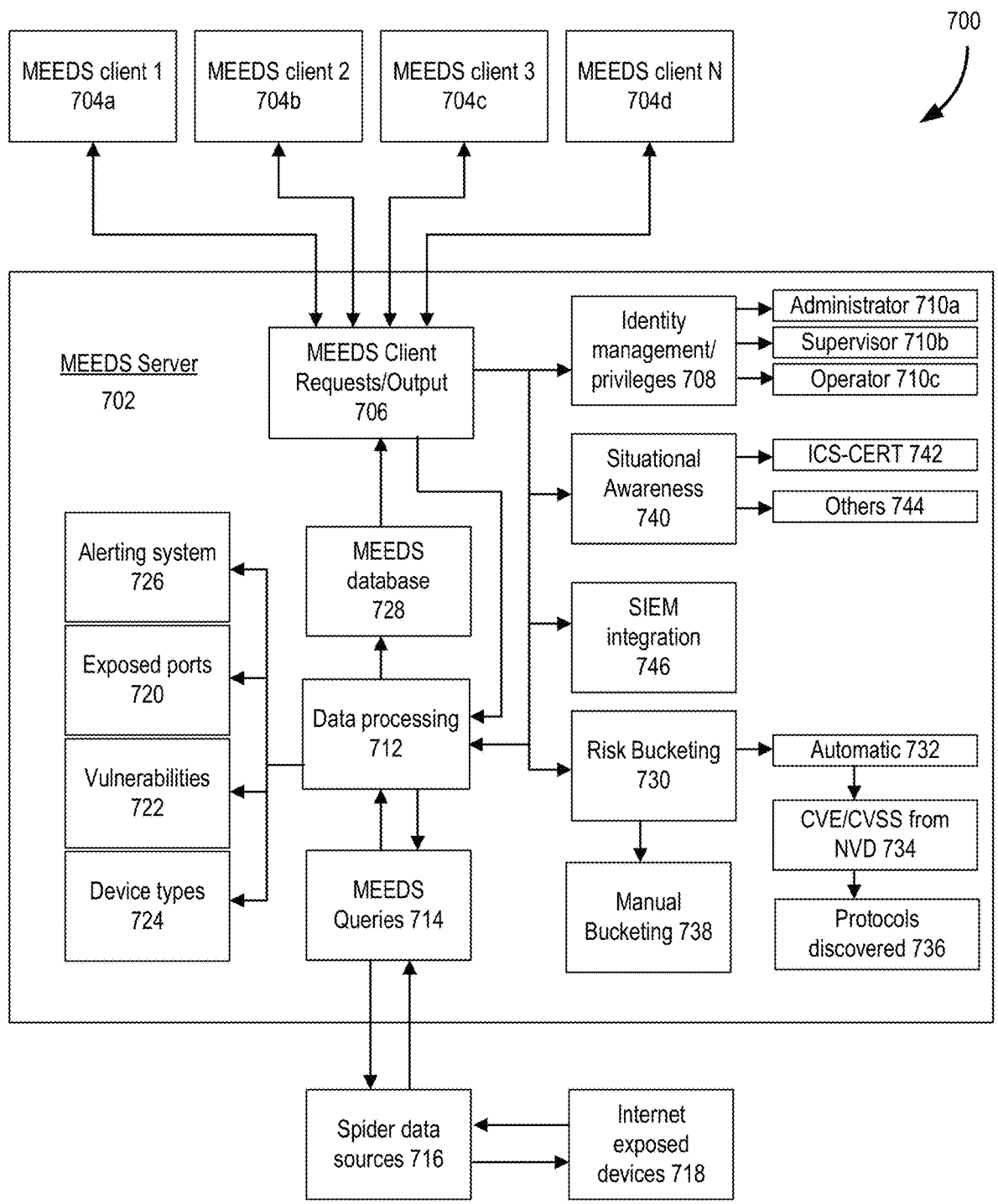
FIG. 7 is a schematic of another example cybersecurity framework.

FIG. 7 shows an example framework mapping 700 including a MEEDS server 702 configured to communicate with MEEDS clients 704a-704d, with client 704d representing an 'nth' client. In some examples, the server 702 can be located locally at a utility or organization running the framework, and in other examples the server 702 can be located externally and/or securely controlled by a separate entity (such as a centralized entity). The clients 704a-704d can be relatively lightweight and can communicate separately from each other with the server 702 through a client request/output section 706. In representative examples, the server 702 is configured to operate on a computer with internet accessibility while the lightweight clients 704a-704d are configured to run on any computer within the network and in communication with the server (e.g., wired, wireless, etc.) to have periodic or continuous reach-outs to the server 702. The client requests/outputs 706 can be restricted with identity management/privileges 708, such as administration 710a, supervisor 710b, and operator 710c. A data processing and enumeration section 712 can be configured to handle various data processing tasks and routing of data to various sections.

The server 702 can include a device query section 714 configured to send requests to one or more web spider data sources 716. The spider data sources 716 then proceed to run the queries on internet exposed devices 718 (e.g., in a user selected IP range) associated with the EDS, utility, or other organization using the framework 700 for risk assessment and monitoring. After the query results are received by the server 702 from the spider data sources 716, the results can be analyzed for exposed ports 720, vulnerabilities 722, and device type 724. In some examples, an alerting system 726 can be responsive to the analyzed data to generate alerts, though the clients 704a-704d can independently provide alerts based on reported data in some examples.

Query results can be filtered and mapped and stored in a database 728 so that results can be used to send risk and vulnerability updates to the clients 704a-704d. The results can also be processed through a risk bucketing routine 730 can categorize devices based on CVSS scores associated with the vulnerabilities 722. Some devices can be assigned CVSS scores based on the device type 724, e.g., in the absence of a CVE. Other devices can be categorized automatically 732 using CVE/CVSS values 734 obtained from the NVD. Risks can also be categorized based on discovered protocols 736. In some examples, devices can be risk categorized manually 738. In some examples, a user can develop their own risk algorithm and upload it into the server 702. Users and other sources can configure risk bucketing to us current or updated information, such as updates based on information received from new data sources, and the user can use their algorithm to recategorize the risk bucketing. The server 702 can also provide other tools connected with cyberattack monitoring and risk assessment, such as situational awareness routines 740 that can be connected with, e.g., ICS CERT 742 or other cybersecurity services 744. The server 702 can also include SIEM integration 746 (security information and event management) to provide security alerts and monitoring. For example, SIEM integration 746 can use security logs including data from the database 728 or other data processed or generated by the server 712 to generate data analytics from the found device exposures, so that the organization or utility can automatically interact with SIEM.

In operation, the framework mapping 700 can be used with limited information or know-how by a user, and with limited information about the user by the supplier of the framework. For example, a user proceed through a series of straightforward steps to select their IP address range or identify a range through simpler methods such as selecting geographical coordinates, and the server 702 can automatically run through various queries associated with the user's preferences. The query process can construct queries for the IP range to find device exposures pertinent to the user, e.g., by asking each database whether there is a Siemans S7 PLC that falls into this IP range. Generated false positives can be filtered by the server 702 so that they are eliminated and devices relevant to the user are identified (e.g., PLCs). After the database 728 is built, the data can be selectively transmitted to the different clients 704a-704d through respective secure channels such that if one of the clients is exposed, the others have independent channels with the sever 702 and the data rules do not let cross-handshakes between the clients 704a-704d.

Example Classifications, Risk Grading, Multi-Source Querying, & Source Aggregation Querying As discussed above, framework examples allow a user to execute a query which can go through the standard TLS-based secure calls to one or more spider databases to pull device banner information, all while communicating in a non-interested way, i.e., without choosing network information. After the banner information is retrieved, a regular expression dictionary that has different pattern matching between different types of device versions and other data fields retrieved from the device banners is used to eliminate false positives and perform a mapping with the filtered data based on versioning, data types, and other data fields such as enumerated common weaknesses (CWEs). For example, a CWE can be used to lookup CVE information in the NVD related to the CWE, and that information combined with other data parameters can be sufficient to confirm a device type. The mapping results in classification of an exposed device into a device type category, such as RTU, PLC, smart inverter, etc. In general, the banner information that can be obtained through the querying of these external databases does not present the device type directly or reliably. That is, typically only IP information would be revealed and a user would have to manually inspect device banner information, though discerning a device type from the information is not guaranteed. Disclosed classifications use a confidence factor relative to a device type based on the regular expression dictionary, e.g., analyzing a certain device's banner information might produce a 50% confidence level of the device being an RTU but a 95% confidence level that the device is a PLC.

Figure 8:
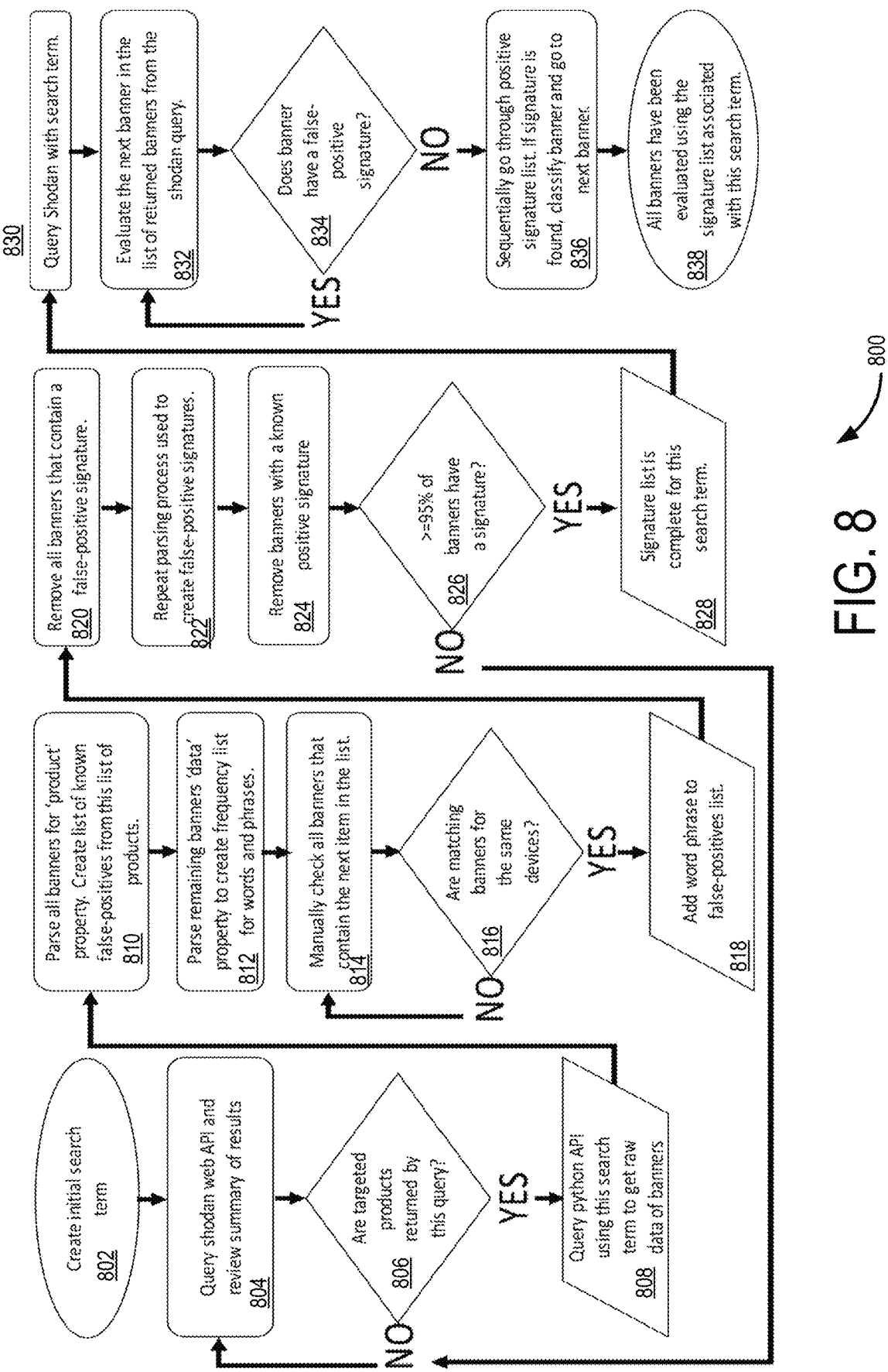
FIG. 8 is a flowchart of a process for building a regular expression dictionary.

FIG. 8 shows an example regular expression dictionary build-up process 800 that can be used in various disclosed classification examples. Steps 802-808 generally correspond to a query step series, steps 810-818 generally correspond to a series creating false-positive signatures, steps 820-828 generally correspond to a series creating positive signatures, and steps 830-838 generally correspond to application of the signatures to classify a device. After a regular expression dictionary has been constructed (which can include a set of dictionaries), the steps 830-838 can be used to execute classification of queried devices.

At 802, an initial search term is selected for a query and at 804 the selected search term is used to query an external spider database. Search terms can include text strings, device types, vendor names, protocols, ports, CVE, as well as other attributes and parameters, or any combination. A check is made as to whether targeted products are returned by the query at 806 and if there are, at 808 banner information data for the returned products is obtained using the available API. At 810, each of the banners of the returned products is parsed for a 'product' property to create a list of known false-positives from the list of products. For example, two products might include a 'PLC' string, with one being a PLC and the other being an RTU. Thus, the "PLC" in isolation can be added to the false positives list for the 'product' property. At 812, the 'data' property of the remaining banners is parsed to create a frequency list of expressions, such as words, phrases, spacings, and other string patterns. At 814-818, each banner is checked whether it contains each expression on the frequency list to determine and label as false positives the word phrases that produce a banner matching for the same device. False positive terms can be further refined with additional terms and phrases to form usable strings. At 820, each banner that contains a false-positive signature is removed from the set of returned products and at 822 the process of creating false-positive signatures at 810-818 is repeated. At 824, each banner with a known positive signature is removed from the returned products and, at 826, if more than 95% have a positive signature then the signature list is complete at 828 for the search term selected at 802. If not, the process of querying the spider database with the search term and determining false-positives and positives 804-826 can be repeated.

After the dictionary is sufficiently built-up, the spider databases can be queried at 830 with the search terms directed at types of EDS or OT products (or tailored to other utilities or organizations). At 832-834, each banner can be evaluated and removed where a false-positive signature is found, and at 836 the remaining banners can be compared to a list of positive signatures so that each banner with a found positive signature can be classified according to the device type corresponding to the positive signature. The process can be repeated for additional search terms, including at periodic intervals so as to update knowledge of an EDS cybersecurity exposure risks.

Figure 9:
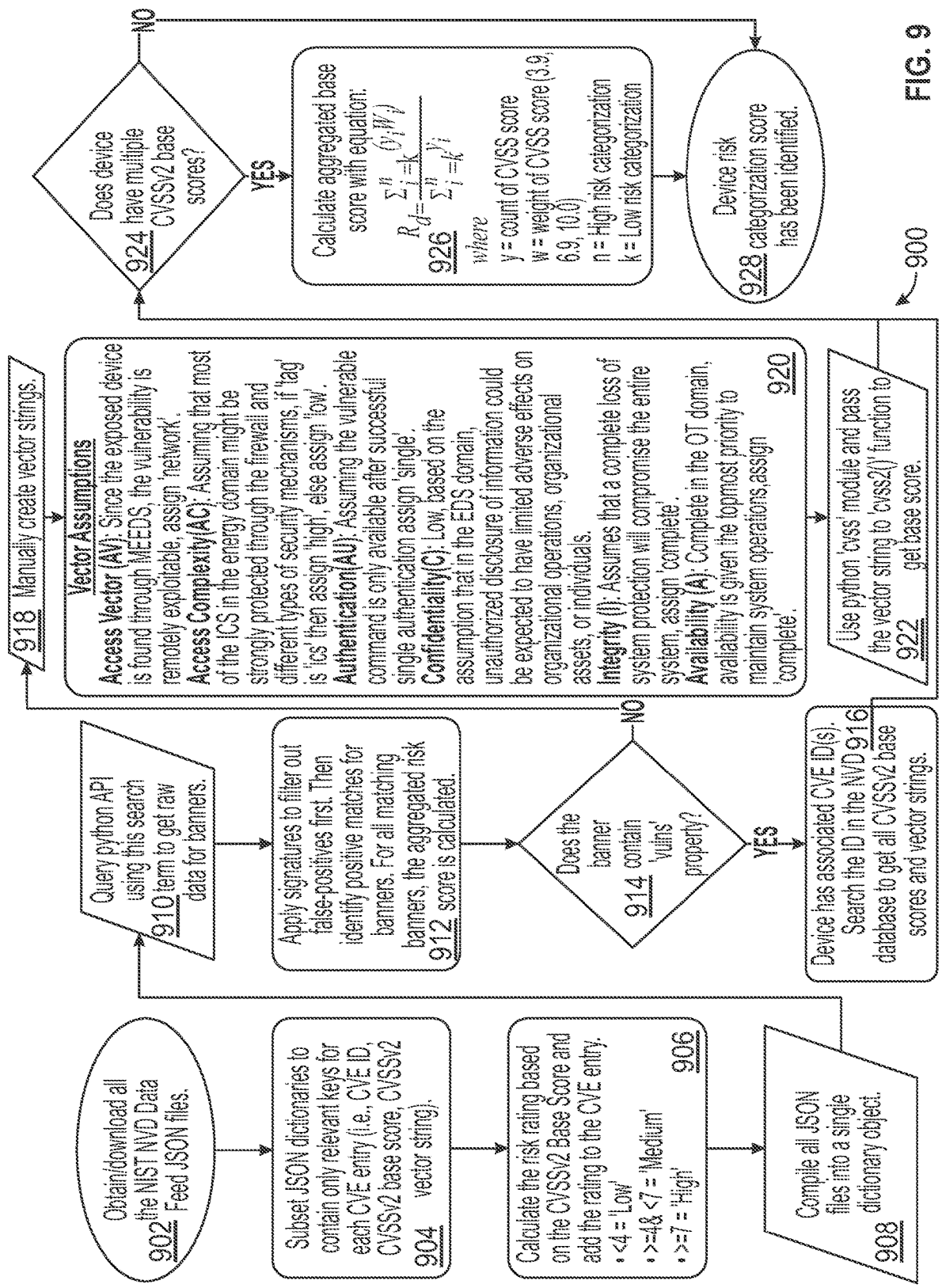
FIG. 9 is a flowchart of an example method of grading cybersecurity risk.

FIG. 9 shows an example method 900 of grading cybersecurity risk using disclosed frameworks. Steps 902-908 generally correspond to building a NVD data feed, steps 910-916 generally correspond to querying a spider database, steps 918-922 generally describe example computation of a CVSS (v2) base score, and steps 924-928 generally describe calculation of an aggregated cybersecurity risk score.

At 902, NIST NVD data feed JSON files can be obtained from the NIST website (e.g., http://nvd.nist.gov/vuln/data-feeds). At 904, JSON dictionaries can be filtered to contain only relevant keys for each CVE entry (i.e., CVE ID, CVSSv2 base score, CVSSv2 vector string). At 906, a risk rating is calculated based on the CVSSv2 Base Score and the rating is added to the CVE entry, where <4='Tow', >=4 & <7='Medium', and >=7='High'. At 908, the JSON files can be compiled into a single dictionary object. At 910, device banner data can be obtained by executing a search query with a spider database, e.g., with a Python API. At 912, device type signatures can be applied to the banner data to filter out false-positives, and then to identify positive for banners that match device types. For all matching banners, an aggregated risk score can be calculated.

At 914, the banner can be checked for the 'vulns' property which generally provides CVE identifiers. For devices with CVE identifiers, at 916, the NVD database is searched to obtain all associated CVSSv2 base scores and vector strings before processing with calculating an aggregated risk score at 924-928. For devices without the CVE identifiers, at 918, 920 vector strings can be estimated based on the identified device type and a series of parameter estimates for Access Vector, Access Complexity, Authentication, Confidentiality, Integrity, and Availability that are associated with the identified device type. At 922, a 'cvss' software module can be used to pass the vector string to a 'cvss2( )' function to obtain a base score estimate for the device having unknown common vulnerabilities and exposures.

At 924, a check can be made for whether a device has multiple CVSS scores (devices with multiple CVSS scores can include devices that have no CVEs listed in the vulns property). A weight CVSS score can be calculated for the device at 926, or if the device does not have multiple CVSS scores then device risk categorization score identification is complete at 928.

Figure 10:
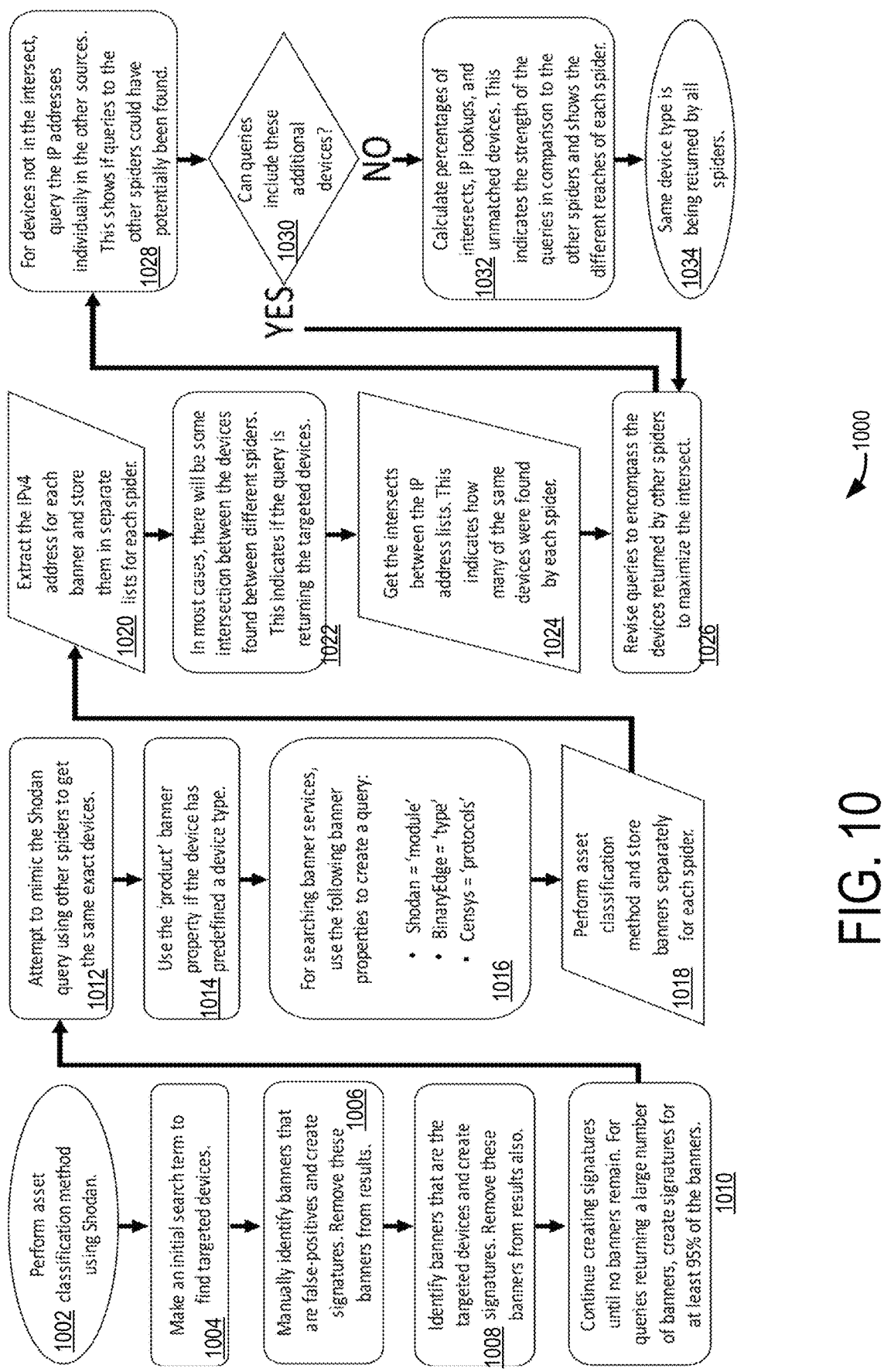
FIG. 10 is a flowchart of an example method of querying multiple spider databases.

FIG. 10 shows an example method 1000 that can be used to query multiple spider databases for improved framework operation. Steps 1002-1010 generally correspond to asset classification steps using the web spider database, e.g., similar to the dictionary build-up process 800. Steps 1012-1018 generally describe a source aggregation procedure, steps 1020-1026 generally describe a sub-process of comparing returned devices, and steps 1028-1034 describe an IPv4 address lookup sub-process.

At 1002 an asset classification method can be performed using the web spider database, and at 1004 an initial search term can be selected for a query to find targeted devices. At 1006, banners can be identified that are false-positives and related signatures can be created so that selected banners can be removed from the results to filter the results. At 1008, banners can be identified that positively correspond to the targeted devices and related positive signatures can be created so that these banners can also be removed from the targeted results. At 1010, signatures can continue to be created until there are no remaining banners, and for queries returning a large number of banners, signatures can be created for a selected sufficient percentage of the banners, such as at least 95% of the banners.

At 1012, an attempt to mimic the web spider database query can be made using multiple spiders, such as Shodan, BinaryEdge, Censys, etc., to determine if the same exact devices are returned. At 1014, the 'product' banner property can be used if the device has predefined a device type. At 1016, the following banner properties can be used to create a query for searching banner services: Shodan='module'; BinaryEdge='type'; Censys='protocols'. At 1018, asset classification can be performed and banners stored separately for each spider. At 1020, the IPv4 address can be extracted for each banner and stored in separate lists for each spider. At 1022-1024, an intersection between the IP address lists between the spider results can be obtained as there will be typically be some overlap between the devices found between different spiders. The overlap can be indicative how many of the same devices were found by each spider. At 1026, the queries can be revised to produce results that encompass the devices returned by other spiders to maximize the intersection. At 1028, for devices that are not present in the results intersection, the IP addresses can be queried individually in the spider sources to determine if queries to the other spiders could have potentially found the devices. At 1030, if queries can be configured to yield the additional devices, then the queries are revised at 1026, and if not, the percentages of intersects, IP lookups, and unmatched devices can be calculated. The percentages can indicate the strength of the queries in comparison to the other spiders and can show the different reaches of each spider. At 1034, the same device type can be returned by all spiders for a device. For example, syntactical mappings between different spider databases can be performed through a mapping table as part of the process, so that, per query, translation occurs automatically before executing it on the spider databases.

Figure 11:
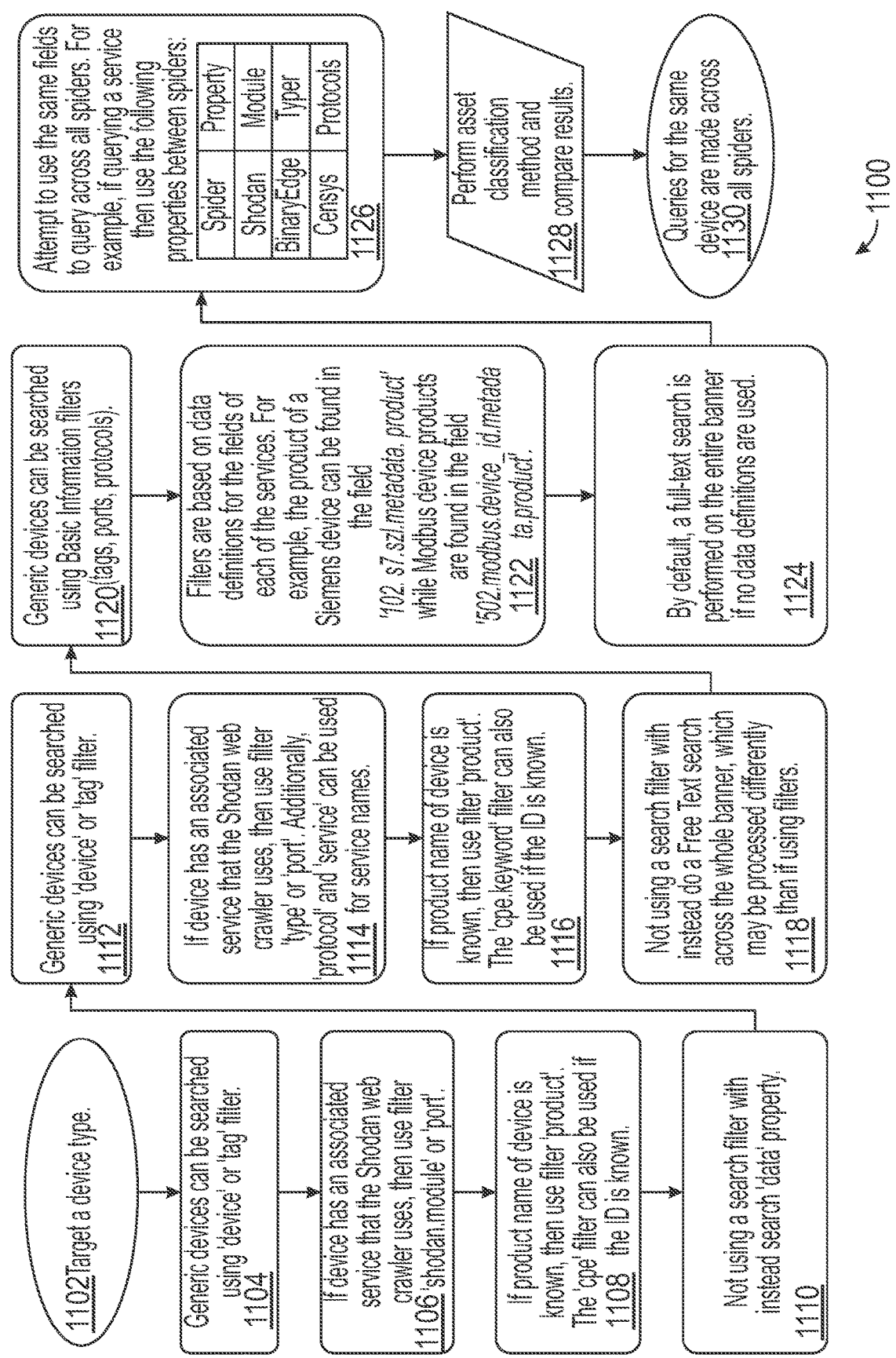
FIG. 11 is a flowchart of an example method of source aggregation querying.

FIG. 11 shows an example method 1100 of source aggregation querying. Steps 1102-1110 generally correspond to web spider queries, 1112-1118 generally correspond to BinaryEdge queries, steps 1120-1124 generally correspond to Censys queries, and steps 1126-1130 generally correspond to a process of aggregating the multiple query results. For the web spiders, at 1102, a device type can be targeted with a query, and at 1104, generic devices can be searched using 'device' or 'tag' filter. At 1106, if a device has an associated service that the web crawler uses, then filter 'shodan.module' or 'port' can be used. At 1108, if a product name of a device is known, then the filter 'product' can be used, or if the ID is known (e.g., CVE ID and/or product ID/Version information), then the 'cpe' filter can also be used. At 1110, a search filter with 'data' property can also performed.

For the BinaryEdge spider, generic devices can be searched at 1112 using 'device' or 'tag' filters. At 1114, if a device has an associated service that the Shodan web crawler uses, then the filter 'type' or 'port' can be used. Additionally, 'protocol' and 'service' filters can be used for service names. At 1116, if the product name of a device is known, then filter 'product' can be used. The 'cpe.keyword' filter can also be used if the ID is known. At 1118, a Free Text search across the entire banner of the device can be performed, which may be processed differently than if using filters. A full list of filters can be found here at https://docs.binaryedge.io/search/.

For the Censys spider, at 1120, generic devices can be searched using "Basic Information" filters (tags, ports, protocols). Censys filters are based on data definitions for the fields of each of the services. For example, the product of a Siemens device can be found in the field '102.s7.szl.metadata.product' while Modbus device products are found in the field '502.modbus.device_id.metadata.product'. At 1122, filters can be selected based on the data definitions for the fields of the services associated with the devices. At 1124, a full-text search can be performed on the entire banner if no data definitions are used. Data definitions can be found at: https://censys.io/ipv4/help/definitions?q=&.

At 1126, an attempt can be made to use the same fields to query across all spiders. For example, if querying a service then use the following properties between spiders: Shodan—Module; BinaryEdge—Type; Censys—Protocols. At 1128, asset classification can be performed, e.g., according to any classification method described herein, and the results can be compared. At 1130, queries for the same device can be made across each of the available spider sources. FIG. 12 shows a table mapping banner properties across spider sources.

Figure 14:
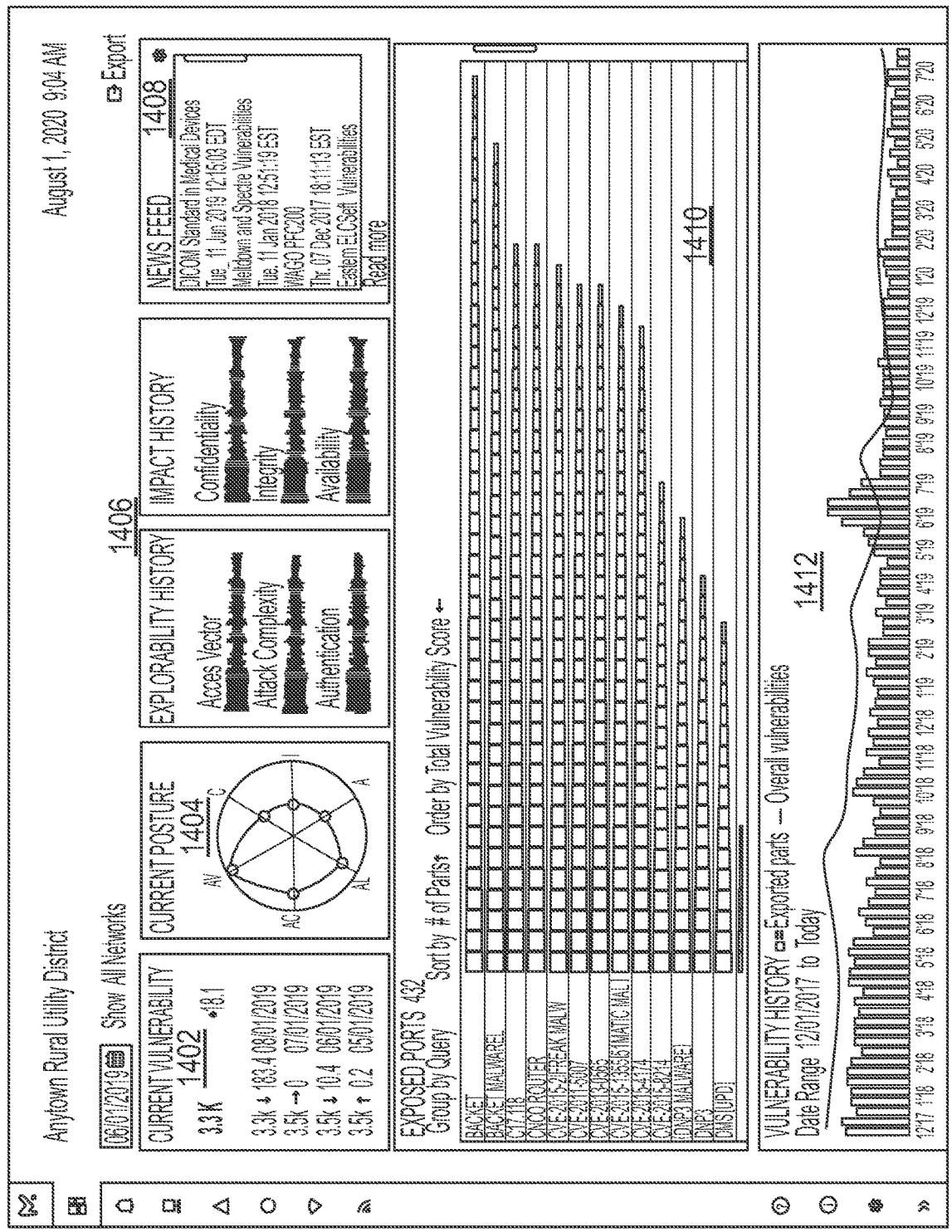
FIG. 14 is a snapshot of a client dashboard that can be used for cybersecurity monitoring.

FIG. 14 is a snapshot of dashboard visualization used with disclosed framework examples. A current aggregate vulnerability level is shown at 1402, which can also summarize differential changes in the level after subsequent spider queries. A current vulnerability posture is shown at 1404 as a radial mapping, with radial extension members corresponding to the vulnerability parameters AV, AC, AU, A, I, C taken from actual or estimated CVSS scores, as discussed previously. Thus, a user can quickly visualize the vulnerability posture of the organization based on its exposed devices, including the relative extent of its exploitability vs impact. A history of the posture of the different vulnerability parameters is shown at 1406. Changes in the NVD, CVEs, or other cybersecurity updates can be summarized in a news feed graphic 1408 (e.g., via RSS NIST publications). A configurable chart of the vulnerability of exposed ports is shown at 1410, and a vulnerability history graph is summarized at 1412.

General Considerations, Example Computing Systems, & Implementation Environments This disclosure is set forth in the context of representative embodiments that are not intended to be limiting in any way.

As used in this application, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "determine," "adjust," "deploy," and "perform" to describe the disclosed methods. These terms are high-level descriptions of the actual operations that are performed. The actual operations that correspond to these terms will vary depending on the particular implementation and are readily discernible by one of ordinary skill in the art.

Figure 13:
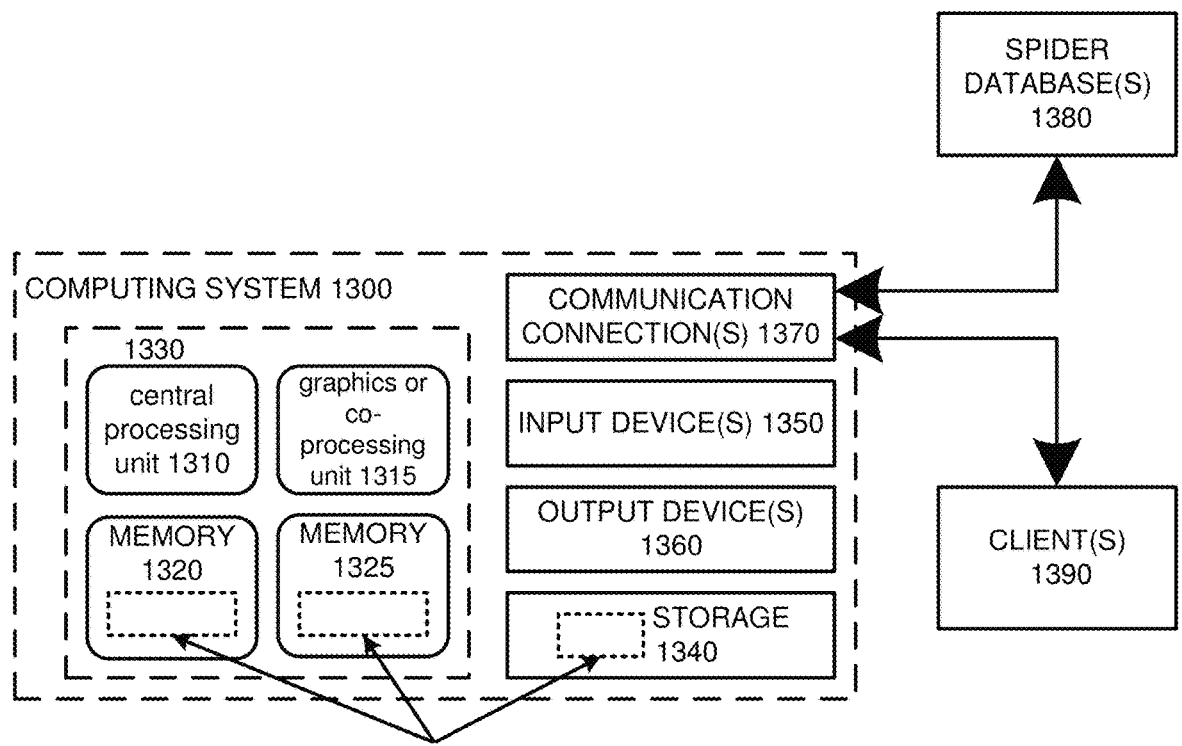
FIG. 13 is schematic of an exemplary computing environment.

FIG. 13 depicts a generalized example of a suitable computing system 1300 in which some of the described frameworks and methods may be implemented. The computing system 1300 is not intended to suggest any limitation as to scope of use or functionality, as the innovations may be implemented in diverse general-purpose or special-purpose computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s). The memory 1320, 1325 stores software 1380 implementing one or more innovations described herein, in the form of computer-executable instructions suitable for execution by the processing unit(s). For example, memory 1320 and 1325 can store a software application configured to execute the processes or frameworks of FIGS. 1-12 and generate the data visualization of FIG. 14.

A computing system may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information and which can be accessed within the computing system 1300. The storage 1340 stores instructions for the software 1380 implementing one or more innovations described herein. For example, storage 1340 can store a software application configured to execute the processes or frameworks of FIGS. 1-12 and generate the data visualization of FIG. 14.

The input device(s) 1350 may be a touch input device such as a keyboard, mouse, pen, or trackball, a voice input device, a scanning device, augmented reality device, or another device that provides input to the computing system 1300. For video encoding, the input device(s) 1350 may be a camera, video card, TV tuner card, or similar device that accepts video input in analog or digital form, or a CD-ROM or CD-RW that reads video samples into the computing system 1300. The output device(s) 1360 may be a display (e.g., for displaying a graphical representations and visualization examples to a user), printer, speaker, CD-writer, or another device that provides output from the computing system 1300.

The communication connection(s) 1370 enable communication over a communication medium to another computing entity, such as spider databases 1380 and framework clients 1390. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including microcontrollers or servers that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved. Furthermore, any features or aspects of the disclosed embodiments can be used in various combinations and subcombinations with one another.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")). The integrated circuit or specialized computing hardware can be embedded in or coupled to components of energy delivery systems or other utilities.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the claimed subject matter is defined by the following claims. We therefore claim all that comes within the scope of these claims.

We claim:

1. A method, comprising:
receiving banner information from one or more queries of a network connecting a set of devices, wherein the banner information of one or more of the devices includes common vulnerability and exposure identifiers (CVEs) and the banner information of one or more of the devices does not include a CVE;
identifying the devices based on the banner information including classifying devices without known CVEs by a device type;
determining vulnerability scores for the devices with known CVEs based on retrieved CVE information; and
determining vulnerability scores for the devices without CVEs based on a series of exploitability and impact parameter estimates associated with the device type classifications;
wherein the classifying the devices by device type includes comparing the device banner information to a regular expression dictionary linking banner information to device types, and selecting as the device type a highest confidence level output from one or more comparison outputs;
wherein the regular expression dictionary includes signatures linking banner information patterns with device types based on a combination of a data value attribute, a version, or a common weakness enumeration (CWE).

2. The method of claim 1, further comprising estimating a cyberattack vulnerability risk for the devices using the determined vulnerability scores.

3. The method of claim 2, wherein the estimating the cyberattack vulnerability risk further includes categorizing the devices into different risk categories according to predetermined ranges of the vulnerability scores.

4. The method of claim 2, wherein the estimating the cyberattack vulnerability risk for a device includes calculating an aggregate weighted vulnerability score.

5. The method of claim 1, further comprising estimating cyberattack vulnerability risks for a subset of the set of devices based a selectable filter attribute.

6. The method of claim 1, wherein the classifying the device type includes removing false positives.

7. The method of claim 1, wherein the device types include one or more of the following device types: programmable logic controller (PLC), remote terminal unit (RTU), supervisory control and data acquisition (SCADA), smart inverter, relay.

8. The method of claim 1, wherein each vulnerability score includes a common vulnerability scoring system (CVSS) vector string and a scalar value.

9. The method of claim 1, further comprising displaying to a user one or more of the vulnerability scores or a risk estimate based on the vulnerability scores.

10. The method of claim 1, further comprising displaying to a user a graphical representation of an estimated cyberattack vulnerability risk posture for the set of devices, wherein the graphical representation includes a plurality of extensions each having an extension amount associated with a weighted average across vulnerability scores for one of the exploitability and impact parameters.

11. The method of claim 1, further comprising re-determining the vulnerability scores after automatically retrieving updated CVE data from an external CVE authority database.

12. The method of claim 1, further comprising tracking and recording a history of the determined vulnerability scores or risk estimates associated with the determined vulnerability scores, and displaying the history to a user.

13. The method of claim 1, further comprising periodically repeating the steps of claim 1 to identify new devices exposed on the network.

14. The method of claim 1, further comprising periodically repeating the steps of claim 1 and notifying a user when cyberattack vulnerability risk changes in relation to one or more thresholds after a re-estimation.

15. The method of claim 1, further comprising predicting an attack pathway to the network by: comparing the determined vulnerability score for a device without a CVE in its banner information to CVSS scores on an external CVSS authority database to determine one or more matching CVSS scores, retrieving CVEs associated with the matching CVSS score, and removing CVEs not associated with the device type.

16. A computer readable medium configured with instructions for performing the method of claim 1.

17. A method, comprising:
classifying a device type for a device having unknown common vulnerabilities and exposures (CVEs) by comparing device banner information to device type patterns of a regular expression dictionary and selecting as the device type the comparison output having the highest confidence level; and
estimating a cyberattack vulnerability of the device based on an attack progression series of exploitability and impact parameter estimates associated with the device type classification;
wherein the regular expression dictionary includes signatures linking banner information patterns with device types based on a combination of a data value attribute, a version, or a common weakness enumeration (CWE).

18. The method of claim 17, further comprising calculating a risk score for the device based on the cyberattack vulnerability estimation.

19. An apparatus, comprising:
a processor and memory configured with processor-executable instructions which, when executed by the processor, cause the processor to:
receive banner information from one or more queries of a network connecting a set of devices, wherein the banner information of one or more of the devices includes common vulnerability and exposure identifiers (CVEs) and the banner information of one or more of the devices does not include a CVE;
identify the devices based on the banner information including classifying devices without known CVEs by a device type;
determine vulnerability scores for the devices with known CVEs based on retrieved CVE information; and
determine vulnerability scores for the devices without CVEs based on a series of exploitability and impact parameter estimates associated with the device type classifications;
wherein the classifying the devices by device type includes comparing the device banner information to a regular expression dictionary linking banner information to device types, and selecting as the device type a highest confidence level output from one or more comparison outputs;
wherein the regular expression dictionary includes signatures linking banner information patterns with device types based on a combination of a data value attribute, a version, or a common weakness enumeration (CWE).

20. The apparatus of claim 19, wherein the memory is further configured with processor-executable instructions to estimate a cyberattack vulnerability risk for the devices using the determined vulnerability scores.

* * * * *

UNITED STATES PATENT AND TRADEMARK OFFICE
CERTIFICATE OF CORRECTION

| | |
|---|---|
| PATENT NO. | : 12,124,582 B2 |
| APPLICATION NO. | : 17/117752 |
| DATED | : October 22, 2024 |
| INVENTOR(S) | : Gourisetti et al. |

Page 1 of 1

It is certified that error appears in the above-identified patent and that said Letters Patent is hereby corrected as shown below:

In the Specification

Column 1, Line 57 "resulted a need" should read --resulted in a need--

Column 6, Line 24 "can used disclosed" should read --can use disclosed--

Column 7, Line 17 "to obtain to obtain" should read --to obtain--

Column 14, Line 66 "because allow a scanner" should read --because they allow a scanner--

Column 15, Line 17 "can be used help" should read --can be used to help--

Column 16, Line 7 "to us current" should read --to use current--

Column 16, Line 25 "a user proceed" should read --a user can proceed--

Column 19, Line 8 "there will be typically be some" should read --there will typically be some--

Signed and Sealed this
Eleventh Day of February, 2025

Coke Morgan Stewart
*Acting Director of the United States Patent and Trademark Office*